United States Patent
Tanimura et al.

(10) Patent No.: US 7,953,319 B2
(45) Date of Patent: May 31, 2011

(54) POSITION CONTROLLER, DRIVING MECHANISM AND IMAGE PICKUP SYSTEM

(75) Inventors: Yasutaka Tanimura, Nara (JP); Takeshi Aoi, Nishinomiya (JP); Nobuya Miki, Ibaraki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 278 days.

(21) Appl. No.: 12/059,053

(22) Filed: Mar. 31, 2008

(65) Prior Publication Data
US 2008/0247748 A1   Oct. 9, 2008

(30) Foreign Application Priority Data

Apr. 4, 2007  (JP) ................................ 2007-098452
Mar. 11, 2008  (JP) ................................ 2008-061712

(51) Int. Cl.
*G03B 13/34* (2006.01)
(52) U.S. Cl. ........................................ 396/133; 310/307
(58) Field of Classification Search .................. 396/502; 310/307
See application file for complete search history.

(56) References Cited

U.S. PATENT DOCUMENTS

| 4,884,557 | A | * | 12/1989 | Takehana et al. | ............. 600/145 |
| 4,977,886 | A | * | 12/1990 | Takehana et al. | ............. 600/151 |
| 5,459,544 | A | * | 10/1995 | Emura | ............. 396/257 |
| 5,685,148 | A | * | 11/1997 | Robert | ............. 60/527 |
| 6,019,113 | A | * | 2/2000 | Allston et al. | ............. 137/1 |
| 6,449,434 | B1 | * | 9/2002 | Fuss | ............. 396/97 |
| 6,574,958 | B1 | * | 6/2003 | MacGregor | ............. 60/527 |
| 6,945,045 | B2 | * | 9/2005 | Hara et al. | ............. 60/527 |
| 2001/0025477 | A1 | * | 10/2001 | Hara et al. | ............. 60/39.02 |
| 2002/0113499 | A1 | * | 8/2002 | von Behrens et al. | ............. 310/12 |
| 2006/0098968 | A1 | * | 5/2006 | Ito et al. | ............. 396/85 |

FOREIGN PATENT DOCUMENTS

JP   2769351 B2   4/1998

* cited by examiner

*Primary Examiner* — Rodney E Fuller
*Assistant Examiner* — Linda B Smith
(74) *Attorney, Agent, or Firm* — Sidley Austin LLP

(57) ABSTRACT

In a position controller, a driving mechanism and an image pickup system according to the present invention, an operation of controlling a position of a movable member is performed by using, as a reference value, a first resistance value giving a first change point at which a resistance change rate per unit temperature change in a shape-memory-alloy member changes from a first rate to a second rate different from said first rate. Thus, the present invention makes it possible to control the position of the movable member based on a resistance of a shape-memory-alloy member, without a position sensor.

14 Claims, 13 Drawing Sheets

FIG.11A
FIG.11B
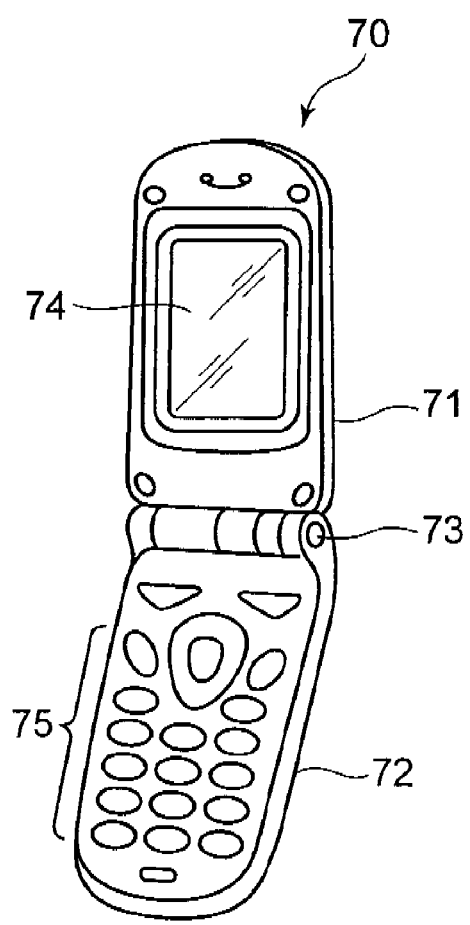
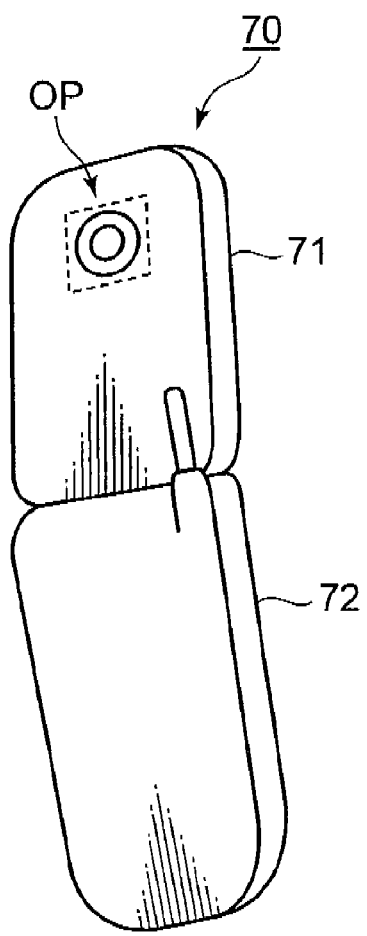

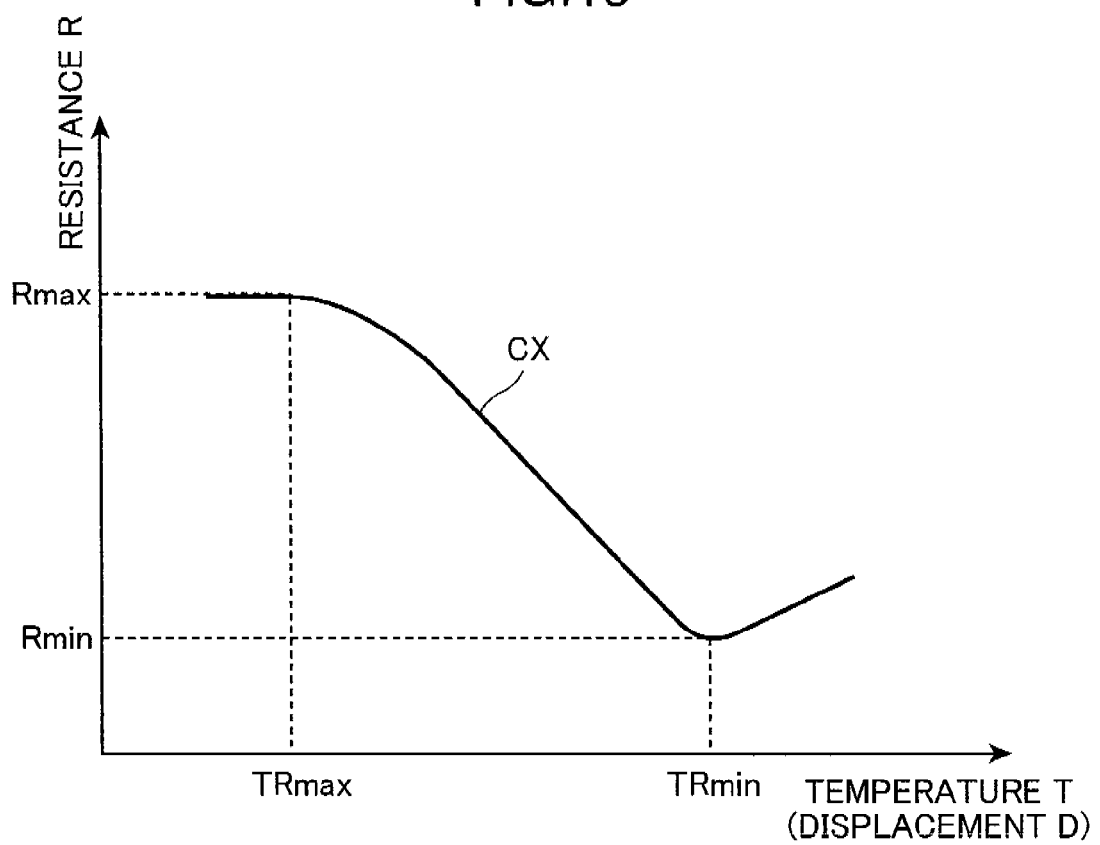

POSITION CONTROLLER, DRIVING MECHANISM AND IMAGE PICKUP SYSTEM

This application is based on Japanese Patent application serial Nos. 2007-098452 and 2008-061712 filed in Japan Patent Office on Apr. 4, 2007 and Mar. 11, 2008, the contents of which are hereby incorporated by reference.

BACKGROUND OF THE INVENTION

1. Field of the Invention

The present invention relates to a position controller usable with a shape-memory-alloy actuator adapted to move a movable member using a shape-memory alloy in a biased manner, and capable of controlling a position of the movable member. The present invention also relates to a driving mechanism and an image pickup system equipped with the position controller and the shape-memory-alloy actuator.

2. Description of the Related Art

A shape-memory alloy (hereinafter referred to as "SMA") has a crystal structure called "austenite phase (parent phase)" at a temperature relatively higher then a transformation temperature, and a different crystal structure called "martensite phase" at a temperature relatively lower then the transformation temperature. In ordinary metal materials, if a given external force is applied thereto, they will never return to their pre-deformed shapes. In contrast, even if an SMA in the martensite phase is deformed due to a given external force applied thereto, the deformed SMA can be heated up to the transformation temperature or more to induce a phase transformation from the martensite phase to the austenite phase, so that the deformed SMA is recovered to its original (i.e., pre-deformed) shape. By utilizing this characteristic, an actuator using an SMA (i.e., shape-memory-alloy actuator) has been developed.

FIG. 13 is a graph showing a relationship between a temperature and a resistance of a shape-memory alloy in an isolated state (i.e., an unbiased state without a biasing force applied thereto). In FIG. 13, the horizontal axis represents a temperature T (displacement D), and the vertical axis represents a resistance R.

As shown in FIG. 13, an SMA in an isolated state has a characteristic CX, wherein the resistance R of the SMA increases along a gradual curve with a rise in the temperature T of the SMA so that it reaches a maximum resistance value Rmax at a given temperature value TRmax, and then turns to decrease so that it reaches a minimum resistance value Rmin at a given temperature value TRmin, whereafter the resistance R turns to increase again (TRmax<TRmin, Rmax>Rmin). Particularly in the range of the maximum resistance value Rmax to the minimum resistance value Rmin, the resistance R of the SMA decreases at a rate proportional to the temperature T of the SMA, while exhibiting high linearity. In addition, a displacement D of the SMA induced by electrical heating corresponds to the temperature T of the SMA, and therefore the characteristic CX illustrated in FIG. 13 can be considered as a relationship between the electrical heating-induced displacement D and the resistance R of the SMA.

As a position controller for such a shape-memory-alloy actuator, there has been developed a type utilizing the SMA's property where the resistance R changes linearly relative to the displacement D, as disclosed, for example, Japanese Patent No. 2769351 (hereinafter referred to as "D1").

A position controller disclosed in the D1 comprises: an actuator adapted to operate based on a displacement of a shape-memory alloy element; driving means adapted to selectively heat and cool the shape-memory-alloy element; comparison means adapted to activate the driving means based on a deviation between a displacement of the actuator and a target displacement value; resistance detection means adapted to detect a resistance R of the shape-memory-alloy element; storage means adapted to obtained and store therein a maximum resistance value Rmax and a minimum resistance value Rmin of the shape-memory-alloy element in advance of initiation of a position control; and displacement calculation means adapted to calculate the displacement of the actuator based on an output of the resistance detection means and information stored in the storage means. In this position controller disclosed in the D1, even if the resistance of the shape-memory-alloy element is fluctuated due to environmental changes, fatigue thereof or other factor, the fluctuation in the resistance can be automatically compensated so as to adequately perform the position control while maintaining a high degree of accuracy. In the D1, with a view to compensating a position of the actuator to perform the position control with further enhanced accuracy, the position controller is additionally provided with a position sensor.

An actuator intended to repeatedly produce movements in response to temperature rise and fall is required to have a two-way (i.e., two-directional) function responsive to the temperature transition or shift. However, although an SMA is recovered to a memorized shape according to heating, the resulting recovered shape of the SMA will be retained even if it is cooled. That is, an SMA in an isolated state has only a one-way (i.e., one-directional) function. Therefore, in one aspect, a shape-memory-alloy actuator is required to have a biasing member operable to apply an external force (biasing force) for deforming the SMA in a second direction different from the one, i.e., first, direction, after shape recovery.

Additionally, in the position control, it is necessary to define a reference position (i.e., a reference value of the position control) for determining a current (i.e., actual) position, and figure out at least one relationship between a displacement (position) and a resistance of the SMA, as a precondition to defining the reference position. It is contemplated to utilize, as this relationship, a displacement (position) of the SMA at a maximum resistance value Rmax, and/or a displacement (position) of the SMA at a minimum resistance value Rmin. However, an actual shape-memory-alloy actuator equipped with the biasing member has a configuration which makes it impossible or difficult for the SMA to exhibit the maximum resistance value Rmax and the minimum resistance value Rmin which otherwise appear in the SMA in the isolated state. Moreover, the structure provided with a position sensor as in the D1 causes an increase in the number of components, which leads to difficulty in downsizing.

SUMMARY OF THE INVENTION

In view of the above circumstances, it is an object of the present invention to provide a position controller capable of performing a position control based on a resistance of an SMA without a position sensor, and a driving mechanism and an image pickup system equipped with the position controller.

In a position controller, a driving mechanism and an image pickup system according to the present invention, an operation of controlling a position of a movable member is performed by using, as a reference value, a first resistance value giving a first change point at which a resistance change rate per unit temperature change in a shape-memory-alloy member changes from a first rate to a second rate different from said first rate. Thus, the present invention makes it possible to control the position of the movable member based on a resistance of a shape-memory-alloy member, without a position sensor.

BRIEF DESCRIPTION OF THE DRAWINGS

FIGS. 11A and 11B are perspective exterior views showing a portable phone incorporating an image pickup system, according to a fourth embodiment of the present invention.

FIG. 13 is a graph showing a relationship between a temperature and a resistance of a shape-memory alloy in an isolated state.

DESCRIPTION OF THE PREFERRED EMBODIMENTS

Figure 1:
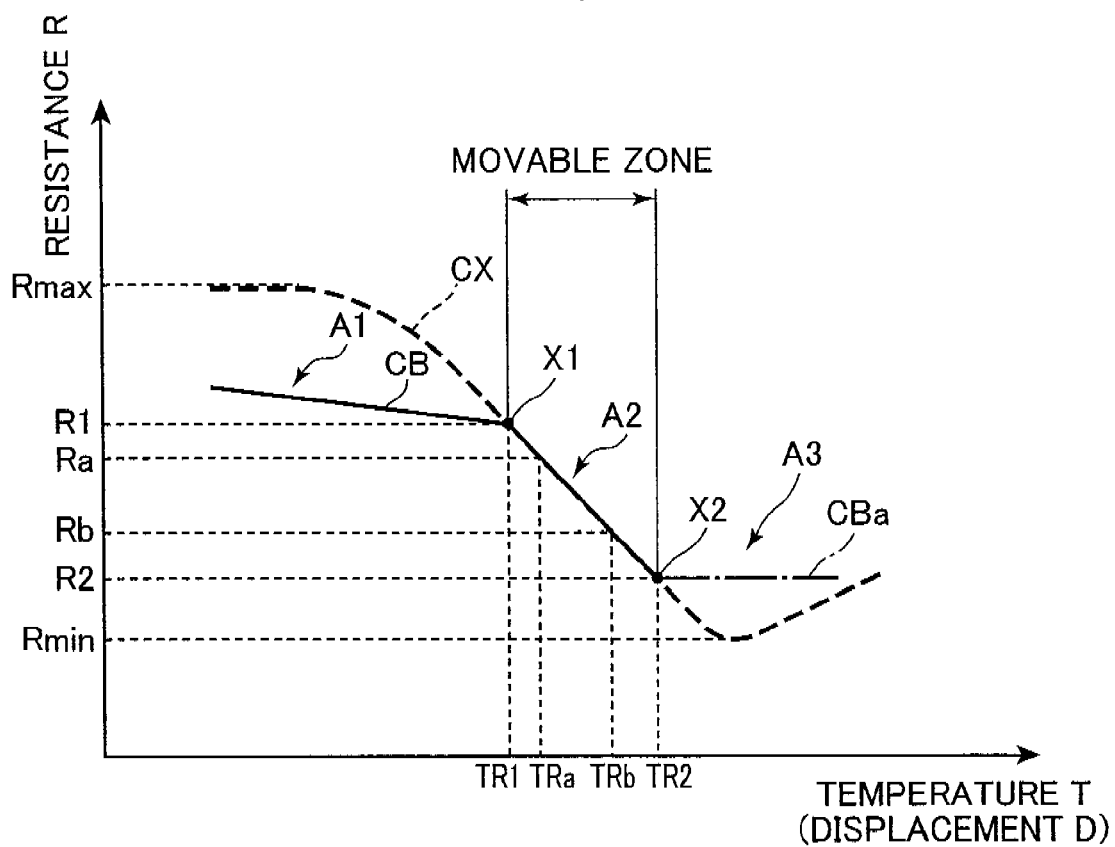
FIG. 1 is a graph showing a relationship between a temperature and a resistance of a shape-memory-alloy member in a biased-type shape-memory-alloy actuator.

An introductory description will be made about inventor's findings or knowledge as a result of various researches. FIG. 1 is a graph showing a relationship between a temperature and a resistance of a shape-memory-alloy member in a biased-type shape-memory-alloy actuator. In FIG. 1, the horizontal axis represents a temperature T (displacement D), and the vertical axis represents a resistance R. The solid line CB indicates a characteristic of the shape-memory-alloy member in a biased-type shape-memory-alloy actuator, and the broken line CX indicates a characteristic of the shape-memory-alloy member in an isolated state. The one-dot chain line CBa indicates a region of the characteristic of the shape-memory-alloy member in the biased-type shape-memory-alloy actuator, where a movement of a movable member is restricted.

As shown in FIG. 1, in a shape-memory-alloy actuator adapted to move a movable member using a shape-memory-alloy member in a biased manner (i.e., a biased-type shape-memory-alloy actuator), along with a rise of the temperature T of the shape-memory-alloy member, a resistance change rate A per unit temperature change changes from a first rate A1 to a second rate A2 different from the first rate A1. Thus, this resistance change-to-temperature change characteristic CB has a first change point X1 at which the resistance change rate A changes from the first rate A1 to the second rate A2 during a course of the rise of the temperature T of the shape-memory-alloy member. In a range having the first rate A1, a driving force produced by the shape-memory-alloy member is less than a biasing force produced by a biasing member, and therefore the movable member is slightly moved or kept approximately stationary. Then, in a range having the second rate A2, the driving force produced by the shape-memory-alloy member becomes greater than the biasing force produced by the biasing member, and thereby the movable member is moved. Furthermore, in the region having the second rate A2, the characteristic CB of the shape-memory-alloy member in the biased-type shape-memory-alloy actuator approximately overlaps the characteristic CX of the shape-memory-alloy member in the isolated state. Thus, the characteristic CB of the shape-memory-alloy member in the biased-type shape-memory-alloy actuator can be considered as a relationship between the electric heating-induced displacement D and the resistance R of the shape-memory-alloy member, with high linearly.

As above, the first change point X1 corresponds to a start point at which the movable member starts moving, and approximately coincides with an initial position of the movable member. Thus, a first resistance value R1 giving the first change point X1 can be used as a reference value to allow a position of the movable member to be controlled based on only the resistance R. The present invention has been made based on the above knowledge, and an embodiment according to one aspect of the present invention will be shown as follows.

An embodiment of the present invention will now be described based on the drawings. In the figures, it means that two or more elements or components defined by the same reference numeral or code are identical to each other. Therefore, duplicate description thereof will be omitted. In this specification, an element or component will be defined by a reference numeral or code without a suffix when it is described as a generic element or component, and will be defined by a reference numeral or code with a suffix when it is described as an individual element or component.

First Embodiment

Figure 2:
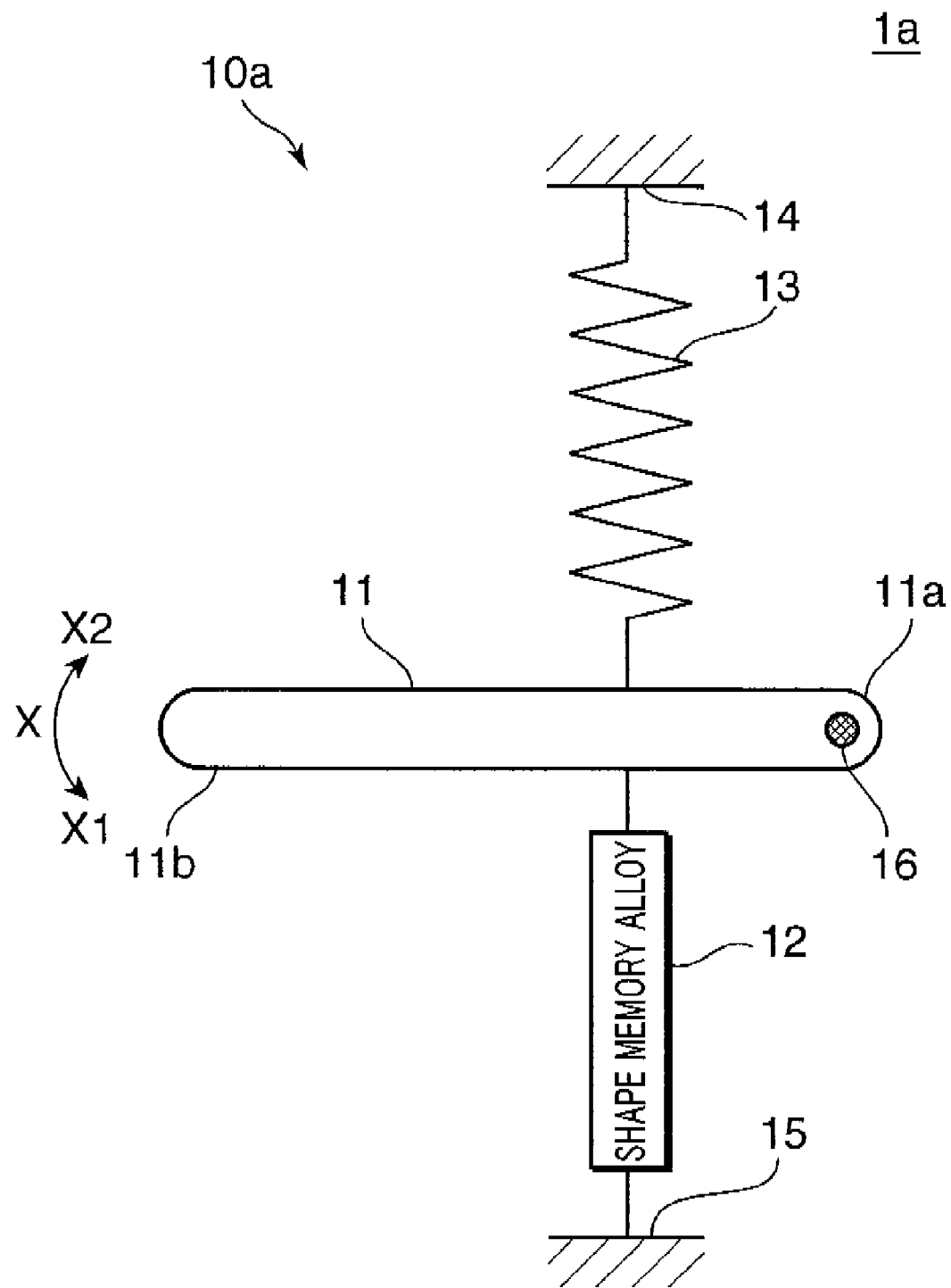
FIG. 2 is a schematic diagram showing the structure of one example of a shape-memory-alloy actuator in a driving mechanism according to a first embodiment of the present invention.
Figure 3:
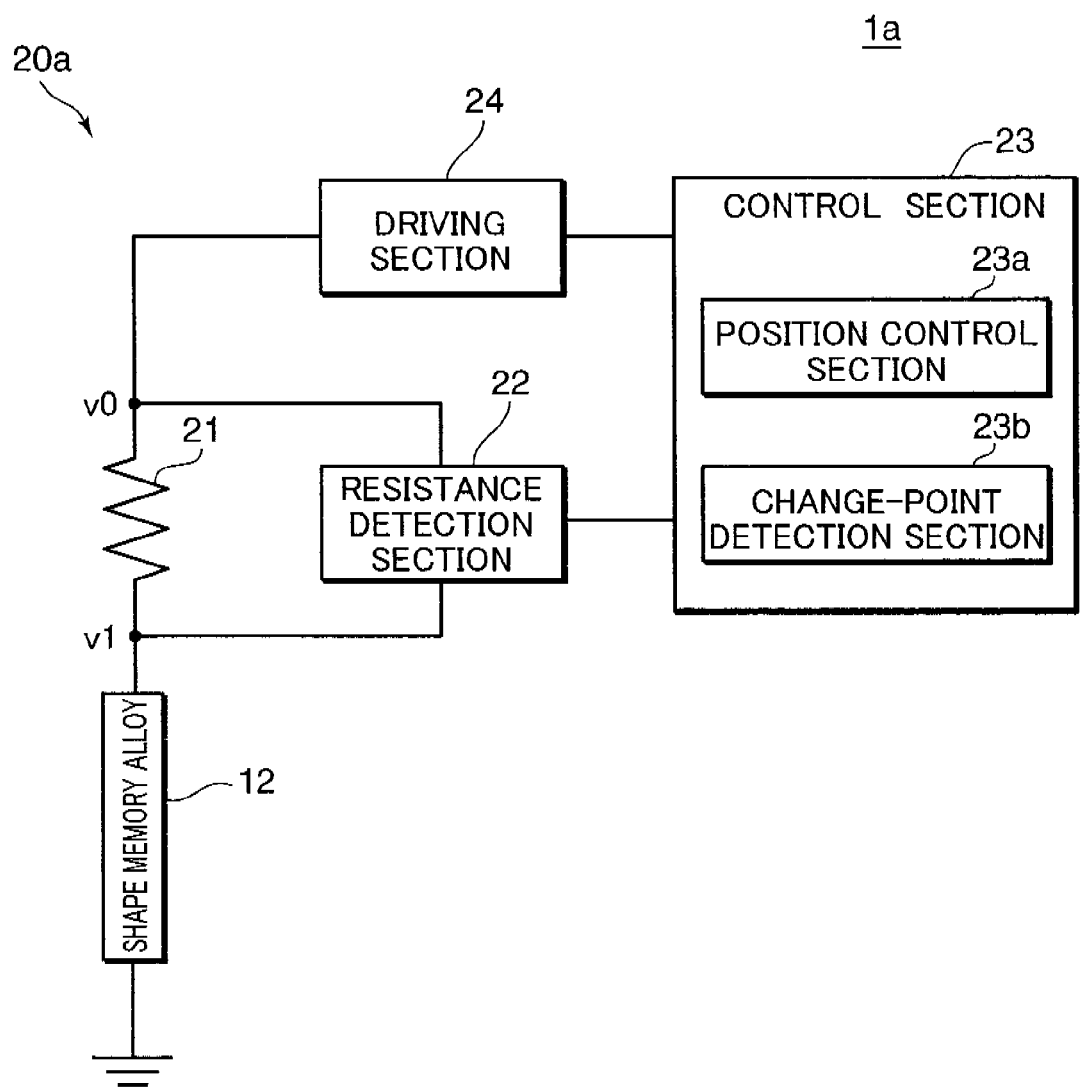
FIG. 3 is a block diagram showing the configuration of one example of a position controller in the driving mechanism according to the first embodiment.

FIG. 2 is a schematic diagram showing the structure of one example of a shape-memory-alloy actuator in a driving mechanism according to a first embodiment of the present invention. FIG. 3 is a block diagram showing the configuration of one example of a position controller in the driving mechanism according to the first embodiment. The driving mechanism 1a according to the first embodiment comprises a shape-memory-alloy actuator 10a adapted to move a movable member 11 using a shape-memory-alloy member 12 in a biased manner, and a position controller 20a adapted to control a position of the movable member 11.

In the example illustrated in FIG. 2, the shape-memory-alloy actuator 10a of the driving mechanism 1a comprises a movable member 11, a shape-memory-alloy member (hereinafter referred to shortly as "SMA member") 12, a biasing member 13 and two immovable members 14, 15.

The SMA member 12 is formed of an SMA prepared to pre-memorize a given shape, and operable, when it is heated, to apply a driving force to the movable member 11. The SMA may be one selected from the group consisting of a Ni—Ti alloy, a Cu—Al—Ni alloy, a Cu—Zn alloy, a Cu—Zn—Al alloy and a Ni—Al alloy. In view of superiority in strength, toughness, corrosion resistance and wear resistance, the Ni—Ti alloy is suitable for the SMA member 12. The SMA member 12 is composed, for example, of a wire (linear-shaped member) having a generally circular shape in section, wherein one end thereof is fixed to the immovable member 15 for fixing the SMA member 12, and the other end thereof is connected to a first predetermined position of the movable member 11. In the example illustrated in FIG. 2, the SMA member 12 is designed to be supplied with electric power and electrically heated by Joule heat produced based on its own resistivity. The SMA member 12 is prepared to pre-memorize a given shape having, for example, a given length dimension, so that, in response to reaching a transformation temperature, it can recover to the pre-memorized shape.

The biasing member 13 is operable to apply a biasing force against the driving force of the SMA member 12, to the movable member 11. The biasing member 13 is composed, for example, of a coil spring (such as a tension coil spring), wherein one end thereof is fixed to the immovable member 14 for fixing the biasing member 13, and the other end thereof is connected to a second predetermined position of the movable member 11. The biasing member 13 serves as a biasing spring of the shape-memory-alloy actuator 10a.

The movable member 11 is designed to be moved according to the driving force of the SMA member 12 and the biasing force of the biasing member 13, and may be formed in any suitable shape. In the example illustrated in FIG. 2, the movable member 11 is a columnar-shaped rod.

A connection relationship between respective ones of the movable member 11, the SMA member 12 and the biasing member 13 will be more specifically described in connection with a movement of each of the members. In the example illustrated in FIG. 2, a surface of the immovable member 14 having the biasing member 13 connected thereto is located in opposed relation to a surface of the immovable member 15 having the SMA member 12 connected thereto. The SMA member 12 produces a driving force in a direction toward the immovable member 15, and the biasing member 13 produces a biasing force in a direction toward the immovable member 14, so that the driving force and the biasing force are oriented in directions opposite to each other. The SMA member 12 and the biasing member 13 are connected to respective opposite sides of the movable member 11 to allow the direction of the driving force produced by the SMA member 12 and the direction of the biasing force produced by the biasing member 13 to lie in a straight line. That is, the first predetermined position is located on an opposite side of the second predetermined position with respect to the movable member 11. Thus, the SMA member 12 is deformed to elongate from the pre-memorized shape, while being biased toward the immovable member 14 according to the biasing force produced by the biasing member 13. Then, the SMA member 12 is electrically heated to shorten at the transformation temperature or more and recover to the pre-memorized shape, so as to produce the driving force in the direction toward the immovable member 15. The movable member 11 has a fixed shaft 16 which penetrates through a hole formed in a first one 11a of opposite ends thereof, and each of the first and second predetermined positions is located between the first end 11a and the other, i.e., second, end 11b. A combination of the movable member 11, the SMA member 12 and the biasing member 13 makes up a lever-like mechanism which has a fulcrum at the fixed shaft 16 (the hole), a point of force at the first and second predetermined positions, and a point of action at the second end. In a power-on state (i.e., a state when electric power is supplied to the SMA member 12), the SMA member 12 is electrically heated up to the transformation temperature or more to shorten and recover to the pre-memorized shape, so as to apply the driving force to the movable member 11, in the direction toward the immovable member 15, whereby the movable member 11 is moved in a direction toward the SMA member 12 (i.e., the direction indicated by the arrow X1 in FIG. 2), swingingly about the fixed shaft 16. In a power-off state (i.e., a state when no electric power is supplied to the SMA member 12), the SMA member 12 is cooled down to a temperature less than the transformation temperature by natural heat release, and the biasing member 13 applies the biasing force to the movable member 11, in the direction toward the immovable member 14, whereby the SMA member 12 is elongated from the pre-memorized shape, and moved in a direction toward the biasing member 13 (i.e., the direction indicated by the arrow X2 in FIG. 2), swingingly about the fixed shaft 16. By virtue of the lever-like mechanism made up of the movable member 11, the SMA member 12 and the biasing member 13, the second end 11b of the movable member 11 can be moved by a distance greater than a displacement of the SMA member 12 (or the biasing member 13).

In the example illustrated in FIG. 2, the first predetermined position and the second predetermined position are set at symmetric position on the opposite sides of the movable member 11. Alternatively, the first and second predetermined positions may be set at asymmetric positions on the opposite sides of the movable member 11. In the example illustrated in FIG. 2, the SMA member 12 and the biasing member 13 are connected to the opposite sides of the movable member 11, respectively. Alternatively, both the SMA member 12 and the biasing member 13 may be connected to the same side of the movable member 11. In this case, the biasing member 13 may be composed, for example, of a coil spring (such as a compression coil spring) operable to produce a biasing force in a direction away from the immovable member 15 (i.e., a direction opposite to that of the driving force of the SMA member 12).

The position controller 20a of the driving mechanism is usable with a shape-memory-alloy actuator adapted to move a movable member 11 using a SMA member 12 in a biased manner, and capable of controlling a position of the movable member 11. In the example illustrated in FIG. 3, the position controller 20a comprises a resistor element 21, a resistance detection section 22, a control section 23, and a driving section 24.

The resistor element 21 has a known electrical resistance. The resistor element 21 is connected in series to the SMA member 12, and grounded through the SMA member 12. The resistor element 21 is designed to divide a voltage V0 across the series circuit consisting of the resistor element 21 and the SMA member 12.

The resistance detection section 22 is operable to detect a resistance of the SMA member 12, and output a value of the detected resistance to the control section 23.

In the example illustrated in FIG. 3, the resistance detection section 22 is operable to detect the voltage across the series circuit consisting of the resistor element 21 and the SMA member 12 and a voltage at a connection point between the resistor element 21 and the SMA member 12, so as to calculate a resistance of the SMA member 12 based on respective values of the detected voltages, and output a value of the calculated resistance to the control section 23. In this example, a resistance Rsma of the SMA member 12 is calculated by the following formula: Rsma=(V1/(V0−V1))×Rd, wherein: Rd is the known resistance of the resistor element 21; V0 is the voltage across the series circuit consisting of the resistor element 21 and the SMA member 12; and V1 is the voltage at the connection point between the resistor element 21 and the SMA member 12.

The control section 23 is a circuit operable to control a general operation of the position controller 20a. The control section 23 is composed, for example, of a microcomputer and a peripheral circuit thereof. The control section 23 functionally includes a position control section 23a and a change-point detection section 23b.

The position control section 23a is operable to control a position of the movable member 11 by using, as a reference value, a first resistance value R1 giving a first change point X1 at which a resistance change rate per unit temperature change in the SMA member 12 changes from a first rate A1 to a second rate A2 different from the first rate A1. Because of the aforementioned movement of the movable member 11, a position of the movable member 11 (e.g., a position of the second end 11b of the movable member 11) corresponds to the displacement D of the SMA member 12, and therefore corresponds to the resistance Rsma of the SMA member 12, as shown in FIG. 1. Thus, the control section 23 is operable to store therein a relationship between the displacement D of the SMA member 12 and the resistance Rsma of the SMA member 12, and derive an actual position of the movable member 11, with reference to the stored relationship and based on a resistance value R1 giving the first change point X1, and an actual resistance value of the SMA member 12 detected by the resistance detection section 22, so as to perform the position control for the movable member 11. More specifically, the control section 23 is operable to store therein the above relationship, for example, in the form of a look-up table or a function formula, and derive an actual displacement D of the SMA member 12, with reference to the stored relationship and based on a difference between a resistance value R1 giving the first change point X1 and an actual resistance value of the SMA member 12 detected by the resistance detection section 22. Then, the control section 23 is operable to derive an actual position of the movable member 11, with reference to an initial position of the movable member 11 at the first change point and based on the derived actual displacement D of the SMA member 12. Subsequently, the control section 23 is operable to output, to the driving section 24, a control signal configured to allow the derived actual position of the movable member 11 to conform to a target position of the movable member 11, so as to perform the position control for the movable member 11.

The change-point detection section 23b is operable to detect the first change point X1 based on a resistance Rsma detected by the resistance detection section 22 while gradually increasing an amount of electric power to be supplied from the driving section 24, and store a resistance value R1 giving the detected first change point X1, in the control section 23.

The driving section 24 is a power supply circuit operable to supply electric power to the SMA member 12 via the resistor element 21, according control of the control section 23. The driving section 24 is composed, for example, of a power supply circuit comprising a discrete element, such as a driver IC or a transistor. In response to receiving the electric power supplied from the driving section 24, the SMA member 12 will be electrically heated up to the transformation temperature or more, and then gradually deformed (recovered) toward the pre-memorized shape according to a value of the temperature (the resistance Rsma). For example, the driving section 24 is operable to adjust an output current value so as to adjust an amount of electric power to be supplied to the SMA member 12, to achieve adjustment of a value of the temperature (resistance Rsma) of the SMA member 12. Alternatively, the driving section 24 may be operable to output a pulsed current while adjusting at least one of a frequency, a duty ratio and a peak value of the pulsed current, so as to adjust an amount of electric power to be supplied to the SMA member 12, to achieve adjustment of a value of the temperature (resistance Rsma) of the SMA member 12. Alternatively, the driving section 24 may be configured to adjust a voltage value so as to adjust the amount of electric power.

An operation of the above driving mechanism 1a according to the first embodiment will be described below. In the position control for the movable member 11, a reference value of the position control is firstly searched. For this search in the position control, the change-point detection section 23b in the control section 23 of the position controller 20a detects the first change point X1 based on a resistance Rsma detected by the resistance detection section 22 while gradually increasing an amount of electric power to be supplied from the driving section 24. A resistance value R1 giving the detected change point X1 will be used as a reference value of the position control.

More specifically, just before and after the first change point X1, a resistance change rate per unit temperature change (unit displacement change) in the SMA member 12 changes from a first rate A1 to a second rate A2 which is greater than the first rate in terms of absolute value.

Thus, for example, in a state when the SMA member 12 in a martensite phase is elongated by the biasing member 13, the change-point detection section 23b adds a given predetermined value s (n+1) to a previous power supply amount S (n) (i.e., an amount of electric power which has supplied to the SMA member 12 in a previous control cycle), to derive a current power supply amount S (n+1) (i.e., an amount of electric power to be supplied to the SMA member 12 in a current control cycle). Then, the change-point detection section 23b controls the driving section 24 to supply electric power to the SMA member 12 in the derived amount S (n+1). In an initial stage of the search operation for the first change point X1, the current power supply amount S (n+1) is set at a predetermined initial power supply amount S1. Specifically, this initial power supply amount S1 is set at a value which allows the SMA member 12 to be heated up to a temperature less than the transformation temperature.

Then, the change-point detection section 23b acquires a resistance Rsma of the SMA member 12 detected by and sent from the resistance detection section 22, as a currently-detected resistance value Rsma (n+1), and stores the acquired resistance value Rsma (n+1).

Then, the change-point detection section 23b subtracts a previously-detected resistance value Rsma (n) from the currently-detected resistance value Rsma (n+1). A result of this subtraction, electric power is supplied to the SMA member 12 in an amount S which causes the SMA member 12 to have a unit temperature change, resulting in a resistance change rate A per unit temperature change (unit displacement change).

Then, the change-point detection section 23b determines whether the change rate resulting from the subtraction is greater than a predetermined determination threshold Th. The resistance change rate A per unit temperature change (unit displacement change) in the SMA member 12 is a negative value. Thus, the change rate resulting from the subtraction and the determination threshold Th are compared with each other in terms of absolute value, and the determination is made depending on whether an absolute value of the change rate resulting from the subtraction is greater than the determination threshold Th.

As a result of the determination, when the change rate resulting from the subtraction is greater than the determination threshold Th, the change-point detection section 23b judges that the currently-detected resistance value Rsma (n+1) is a resistance value giving the first change point X1, and stores the currently-detected resistance value Rsma (n+1) in the control section 23, as the resistance value giving the first change point X1. Alternatively, the previously-detected resistance value Rsma (n) may be used as the resistance value giving the first change point X1, in place of the currently-detected resistance value Rsma (n+1).

The first resistance value R1 is less than a maximum resistance value Rmax of the SMA member 12 in an isolated state (i.e., an unbiased state without a biasing force applied thereto). Thus, after the maximum resistance value Rmax of the SMA member 12 in the isolated state is obtained and stored in the control section 23 in advance, a determination on a false detection of the first resistance value R1 may be made by determining whether the detected first resistance value R1 is less than the maximum resistance value Rmax of the SMA member 12 in the isolated state by the change-point detection section 23b.

Further, the first resistance value R1 is greater than a minimum resistance value Rmin of the SMA member 12 in the isolated state. Thus, after the minimum resistance value Rmin of the SMA member 12 in the isolated state is obtained and stored in the control section 23 in advance, a determination on a false detection of the first resistance value R1 may be made by determining whether the detected first resistance value R1 is greater than the minimum resistance value Rmin of the SMA member 12 in the isolated state by the change-point detection section 23b.

Differently from the above determination result, when the change rate resulting from the subtraction is equal to or less than the determination threshold Th, in order to compare a subsequently-detected resistance value Rsma (n+2) with the determination threshold Th, the change-point detection section 23b returns a routine to the aforementioned power supply amount calculation step to calculate an amount S (n+2) of electric power to be supplied to the SMA member 12 in a subsequent control cycle. In the above operation, the unit temperature change may be set at a smaller value to allow the first change point X1 and a resistance value R1 giving the first change point X1 to be detected with a higher degree of accuracy. This makes it possible to perform the position control for the movable member 11 with a higher degree of accuracy. When the unit temperature change is set at an upper limit of resolution in the resistance detection section 22, the first change point X1 is detected with the highest degree of accuracy.

As above, the change-point detection section 23b is operable to gradually increase an amount S (n+1) of electric power to be supplied to the SMA member 12 by a given value s (n+1) causing the SMA member 12 to have a unit temperature change, and the resistance detection section 22 is operable to detect a resistance Rsma of the SMA member 12 in each of the power supply amounts S. Then, the change-point detection section 23b is operable to calculate a difference between a currently-detected resistance value Rsma (n+1) and a previously-detected resistance value Rsma (n), and determine whether the calculated difference is greater than a determination threshold Th, wherein the change-point detection section 23b is operable, when the calculated difference is greater than a determination threshold Th, to judge that the first change point X1 is found out, and store the currently-detected resistance value Rsma (n+1) in the control section 23, as a first resistance value R1 giving the first change point X1.

Through the above operation of the change-point detection section 23b, the first change point X1 is found out, and a resistance value R1 giving the first change point X1 is detected. The resistance value R1 giving the first change point X1 is used as an initial position of the movable member 11, i.e., as a reference value of the position control for the movable member 11. In the first embodiment, the shape-memory-alloy actuator 10a is formed and driven as mentioned above. Thus, the initial position of the movable member 11 corresponds to a position of the movable member 11 in a state when the SMA member 12 in a martensite phase is elongated by the biasing member 13.

In the operation of controlling a position of the movable member 11 in the shape-memory-alloy actuator 10a, the position controller 20a is operable to control a position of the movable member 11, based on an actual resistance value Rsma of the SMA member 12 detected by the resistance detection section 22, by using the resistance value R1 giving the first change point X1 as a reference value.

Through this operation, the driving mechanism 1a according to the first embodiment and the position controller 20a can perform the position control for the movable member 11 in the shape-memory-alloy actuator 10a, based on a resistance Rsma of the SMA member 12, without a position sensor.

In the first embodiment, the operation of searching the reference value of the position control is not limited to the aforementioned strategy, but any other suitable strategy may be used.

The first change point X1 is an intersecting point between a straight line CB1 on which the resistance change rate A per unit temperature change (displacement change) in the SMA member 12 is the first rate A1, and a straight line CB2 on which the resistance change rate A per unit temperature change (displacement change) in the SMA member 12 is the second rate A2.

Taking an example, in a state when the SMA member 12 in a martensite phase is elongated by the biasing member 13, the change-point detection section 23a is operable to supply electric power to the SMA member 12 in a plurality of different amounts S allowing the SMA member 12 to be electrically heated up to a temperature less than the transformation temperature, and the resistance detection section 22 is operable to detect a resistance Rsma of the SMA member 12 in each of the power supply amounts S. A temperature of the SMA member 12 in each of the power supply amounts S is measured in advance. Then, the change-point detection section 23b is operable, based on the detection result, to obtain the straight line CB1 on which the resistance change rate A per unit temperature change (displacement change) in the SMA member 12 is the first rate A1. In this case, the number of the power supply amounts S is preferably set at a larger value to obtain the straight line CB1 with a higher degree of accuracy, although it may be at least two in view of simply obtaining the straight line CB1.

Then, the change-point detection section 23b is operable to supply electric power to the SMA member 12 in a plurality of different amounts S allowing the SMA member 12 to be electrically heated up to a temperature equal to or greater than the transformation temperature, and the resistance detection section 22 is operable to detect a resistance Rsma of the SMA member 12 in each of the power supply amounts S. A temperature of the SMA member 12 in each of the power supply amounts S is measured in advance. Then, the change-point detection section 23b is operable, based on the detection result, to obtain the straight line CB2 on which the resistance change rate A per unit temperature change (displacement change) in the SMA member 12 is the second rate A1. In this case, the number of the power supply amounts S is preferably set at a larger value to obtain the straight line CB2 with a higher degree of accuracy, although it may be at least two in view of simply obtaining the straight line CB2.

Then, the change-point detection section 23b is operable to calculate an intersecting point between the obtained straight lines CB1, CB2, and store a resistance value R at the calculated intersecting point, in the control section 23. The calculated intersecting point corresponds to the first change point X1, and the resistance value R corresponds to the first resistance value R1. Given that the straight line CB1 is expressed as "y=A1x+α", and the straight line is expressed as "y=A2x+β", the first change point X1 is expressed as follows: $((\alpha-\beta)/(A2-A1), \alpha(\alpha-\beta)/(A2-A1)+\beta)$.

The change-point detection section 23b configured as above can calculate the first change point X1 based on at least four measurement points, and derive the first resistance value R1 giving the first change point X1. This makes it possible to perform the operation of searching the reference value of the position control within a shorter period of time.

In the first embodiment, the shape-memory-alloy actuator 10 adapted to move a movable member using a SMA member in a biased manner is not limited to the aforementioned structure, but any other suitable structure may be used. Taking an example, the structure illustrated in FIG. 4 and the structure illustrated in FIGS. 8 and 10 may be used.

Figure 4:
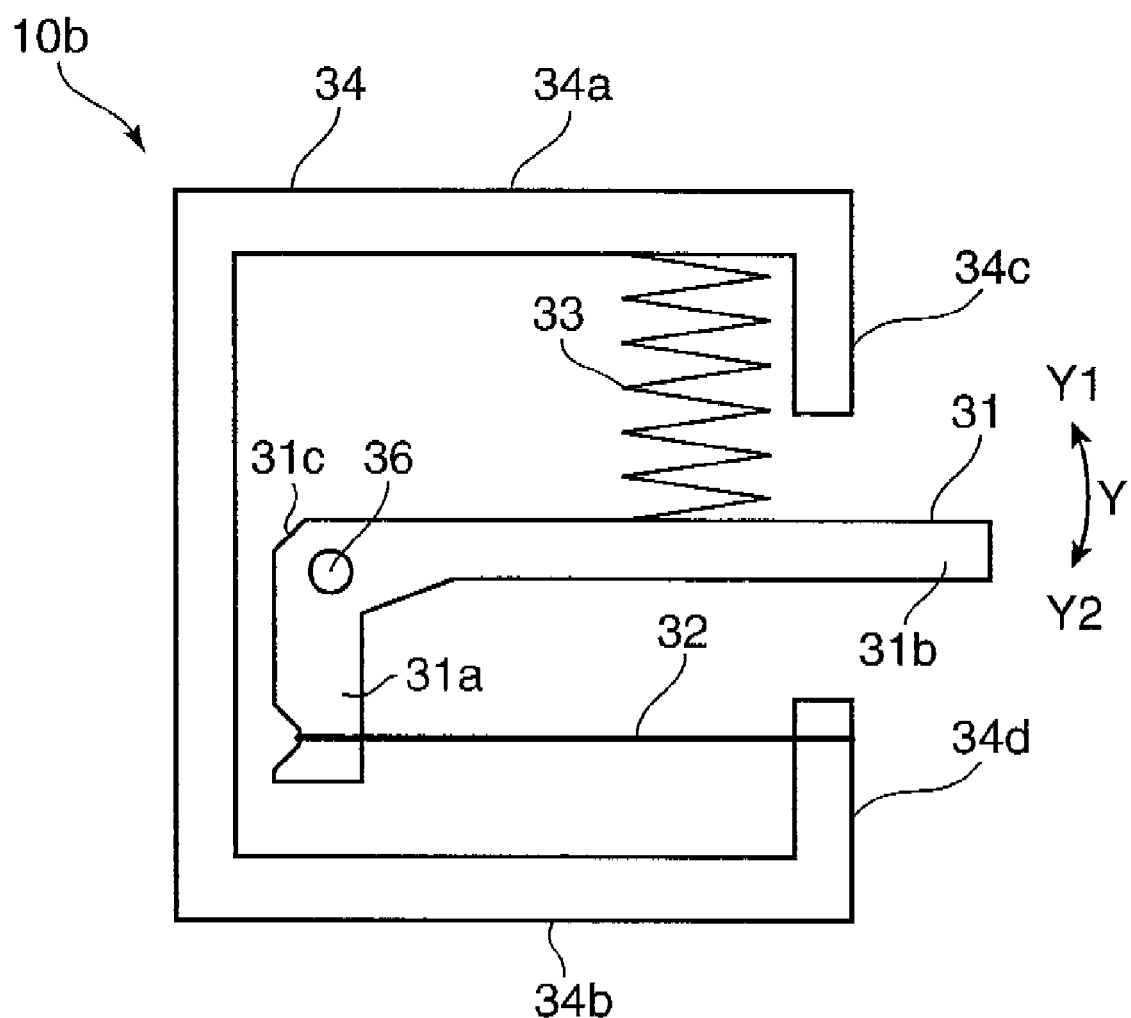
FIG. 4 is a schematic diagram showing the structure of another example of the shape-memory-alloy actuator in the driving mechanism.

FIG. 4 is a schematic diagram showing the structure of another example of the shape-memory-alloy actuator in the driving mechanism. In FIG. 4, this shape-memory-alloy actuator 10b comprises a movable member 31, a SMA member 32, a biasing member 33, and a frame 34.

The movable member 31 is designed to be moved according to a driving force of the SMA member 32 and a biasing force of the biasing member 33. In this example, the movable member 31 is composed, for example, of a generally L-shaped member prepared by bending a columnar-shaped rod at about 90 degrees to have a first arm extending from the bent portion 31c to a first end 31a thereof, and a second arm extending from the bent portion 31c to a second end 31b thereof.

As with the SMA member 12 in the first example, the SMA member 32 is formed of an SMA prepared to pre-memorize a given shape, and operable, when it is heated, to apply a driving force to the movable member 31. The SMA member 32 has a first end fixed to the frame 34, and a second end connected to the first end 31a of the movable member 31.

The biasing member 33 is operable to apply a biasing force against the driving force of the SMA member 32, to the movable member 31. The biasing member 33 is composed, for example, of a coil spring (such as a compression coil spring), wherein a first end thereof is fixed to the frame 34, and a second end thereof is connected to the second arm of the movable member 11. The biasing member 33 serves as a biasing spring of the shape-memory-alloy actuator 10b.

The frame 34 is a member formed in a generally angular-C shape in section to house the SMA member 32 and the biasing member 33. The frame 34 also serves as an immovable member for fixing the SMA member 32 and the biasing member 33. The frame 34 has a stopper portion provided at an opening of the angular-C shape to narrow a distance of the opening so as to restrict a movable range of the movable member 31. In the example illustrated in FIG. 4, the stopper portion includes an upper stopper wall 34c extending (hanging) from an edge of an upper wall 34a defining an upper portion of the angular-C shape in the frame 34, downwardly at about 90 degrees with the upper wall 34a, and a lower stopper wall 34d extending (standing) from an edge of a lower wall 34b defining a lower portion of the angular-C shape in the frame 34, upwardly at about 90 degrees with the lower wall 34b. The distance of the opening is defined between respective opposed distal edges of the upper stopper wall 34c and the lower stopper wall 34d, and the movable range of the movable member 31 is set to fall within the distance of the opening.

In the example illustrated in FIG. 4, the first end of the SMA member 32 is fixed to the lower stopper wall 34d of the frame 34, and the SMA member 32 is operable to produce a driving force in a direction toward the lower stopper wall 34d. The first end of the biasing member 33 is fixed to an inner surface of the upper wall 34a of the frame 34, and the biasing member 33 is operable to produce a biasing force in a direction away from the upper wall 34a. The generally L-shaped movable member 31 has a fixed shaft 36 which penetrates through a hole formed in the bent portion 31c. The second end of the SMA member 32 and the second end of the biasing member 33 are connected, respectively, to the first end 31a and the second arm of the movable member 31, on opposite sides of the bent portion 31c. Thus, the SMA member 32 is biased in a direction away from the lower stopper wall 34d by the biasing force induced by the biasing member 33, and thereby deformed to elongate from the pre-memorized shape. Then, the SMA member 32 is electrically heated to shorten at a transformation temperature or more and recover to the pre-memorized shape so as to produce the driving force in a direction toward the lower stopper wall 34d. In this manner, the biasing member 33 applies the biasing force against the driving force of the SMA member 32, to the movable member 31. A combination of the movable member 31, the SMA member 32 and the biasing member 33 makes up a lever-like mechanism which has a fulcrum at the fixed shaft 36 (the hole), a point of force at a given connection position between the first end 31a of the movable member 31 and the SMA member 31 and a given connection position between the second arm of the movable member 31 and the biasing member 33, and a point of action at the second end 31b of the movable member. In a power-on state (i.e., a state when electric power is supplied to the SMA member 32), the SMA member 32 is electrically heated up to the transformation temperature or more to shorten and recover to the pre-memorized shape, so as to apply the driving force to the first end 31a of the movable member 31, in the direction toward the lower stopper wall 34d, whereby the second end 31b of the movable member 31 is moved in a direction toward the biasing member 33 (the upper stopper wall 34c) (i.e., the direction indicated by the arrow Y1 in FIG. 4), rotationally about the fixed shaft 36. In a power-off state (i.e., a state when no electric power is supplied to the SMA member 32), the SMA member 32 is cooled down to a temperature less than the transformation temperature by natural heat release, and the biasing member 33 applies the biasing force to the second end 31b of the movable member 31, in the direction away from the upper wall 34a, whereby the second end 31b of the SMA member 32 is elongated from the pre-memorized shape, and moved in a direction toward the lower stopper wall 34d (i.e., the direction indicated by the arrow Y2 in FIG. 4), rotationally about the fixed shaft 36. By virtue of the lever-like mechanism made up of the movable member 31, the SMA member 32 and the biasing member 33, and the second arm having a length greater than that of the first arm, the second end 31b of the movable member 31 can be moved by a distance greater than a displacement of the SMA member 32.

In the first embodiment, the position controller 20 usable with a shape-memory-alloy actuator 10 adapted to move a movable member using a SMA member in a biased manner, and capable of controlling a position of the movable member, is not limited to the aforementioned configuration, but any other suitable configuration may be used. Taking an example, the configuration illustrated in FIG. 5 may be used.

Figure 5:
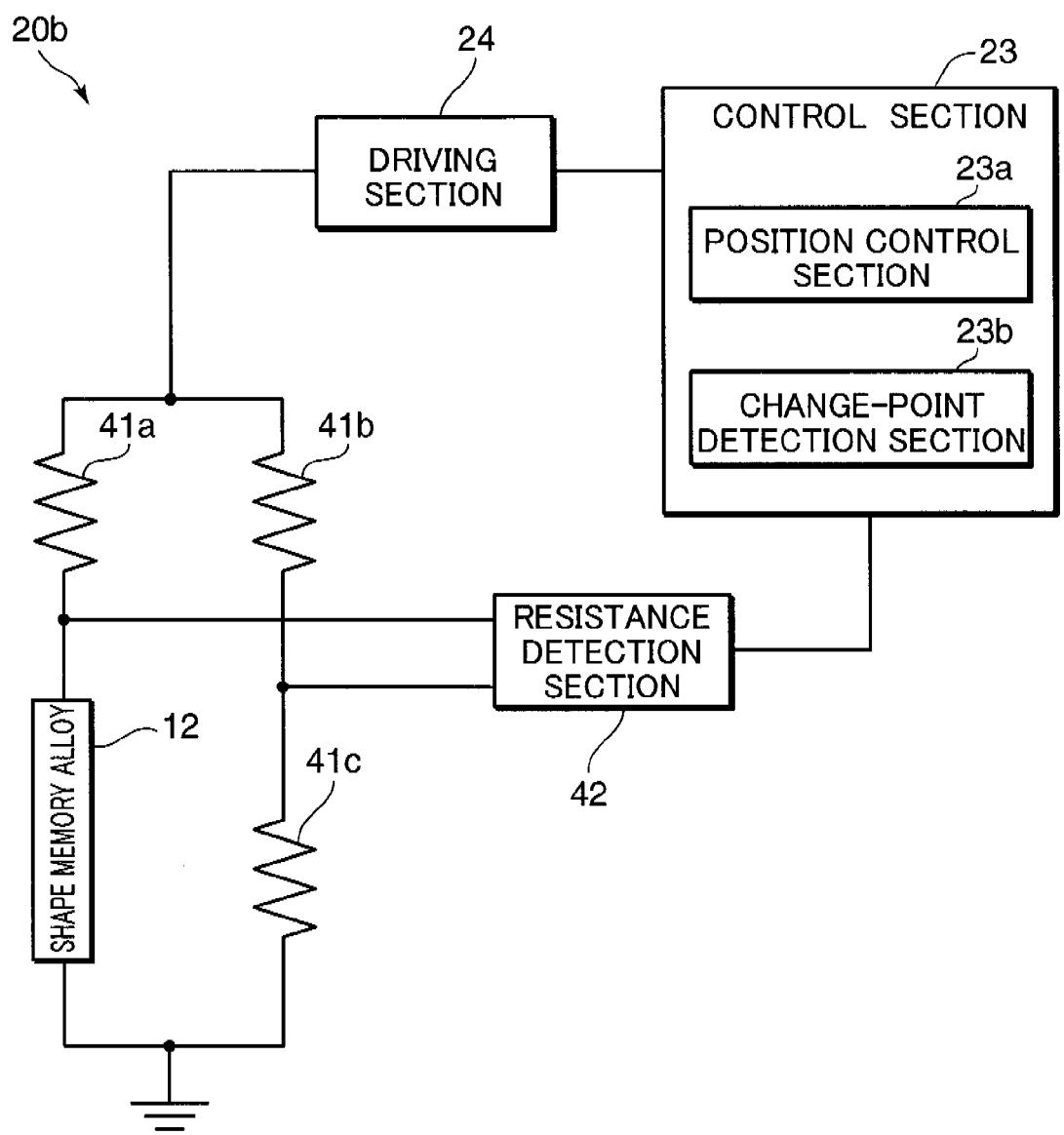
FIG. 5 is a block diagram showing the configuration of another example of the position controller in the driving mechanism.

FIG. 5 is a block diagram showing the configuration of another example of the position controller in the driving mechanism. The position controller 20a illustrated in FIG. 3 is a circuit designed such that the resistor element 21 is connected in series to the SMA member 12 to detect a resistance Rsma of the SMA member 12, whereas a position controller 20b illustrated in FIG. 5 is a circuit designed such that a bridge circuit is made up of first to third resistor elements 41a to 41c and the SMA member 12 to detect a resistance Rsma of the SMA member 12.

In FIG. 5, the position controller 20b comprises first to third resistor elements 41a to 41c, a resistance detection section 42, a control section 23, and a driving section 24. The control section 23 and the driving section 24 of the position controller 20b are identical, respectively, to the control section 23 and the driving section 24 of the position controller 20a, and therefor their description will be omitted.

Each of the first to third resistor elements 41a to 41c has a known electrical resistance. The first resistor element 41a is connected in series to the SMA member 12, and grounded through the SMA member 12. The second resistor element 41b is connected in series to the third resistor element 41c, and grounded through the third resistor element 41c. The series circuit consisting of the first resistor element 41a and the SMA member 12 and the series circuit consisting of the second and third resistor elements 41b, 41c are connected in parallel with each other. The driving section 24 is connected to a connection point between the first and second resistor elements 41a, 41b.

The resistance detection section 42 is a circuit operable to detect a resistance of the SMA member 12, and output a value of the detected resistance to the control section 23.

In the example illustrated in FIG. 5, the resistance detection section 42 is operable to detect a voltage at the connection point between the first resistor element 41a and the SMA member 12, and a voltage at a connection point between the second and third resistor elements 41b, 41c, so as to calculate a resistance of the SMA member based on respective values of the detected voltages, and output a value of calculated resistance to the control section 23. In this example, a resistance Rsma of the SMA member 12 is calculated by the following formula: Rsma=(V2/((1+Rd2/Rd3)V3−V2))× Rd1, wherein: Rd1 to Rd3 are respective known resistances of the resistor elements 41a to 41c; V2 is the voltage at the connection point between the first resistor element 41a and the SMA member 12, and V3 is the voltage at the connection point between the second and third resistor elements 41b, 41c.

The position controller 20a illustrated in FIG. 3 can detect a resistance Rsma of the SMA member 12 in a simple configuration. The position controller 20b illustrated in FIG. 5 can detect a resistance Rsma of the SMA member 12 with a higher degree of accuracy. This makes it possible to control a position of the movable member 11 with a higher degree of accuracy.

The following description will be made about another embodiment of the present invention.

Second Embodiment

Figure 6:
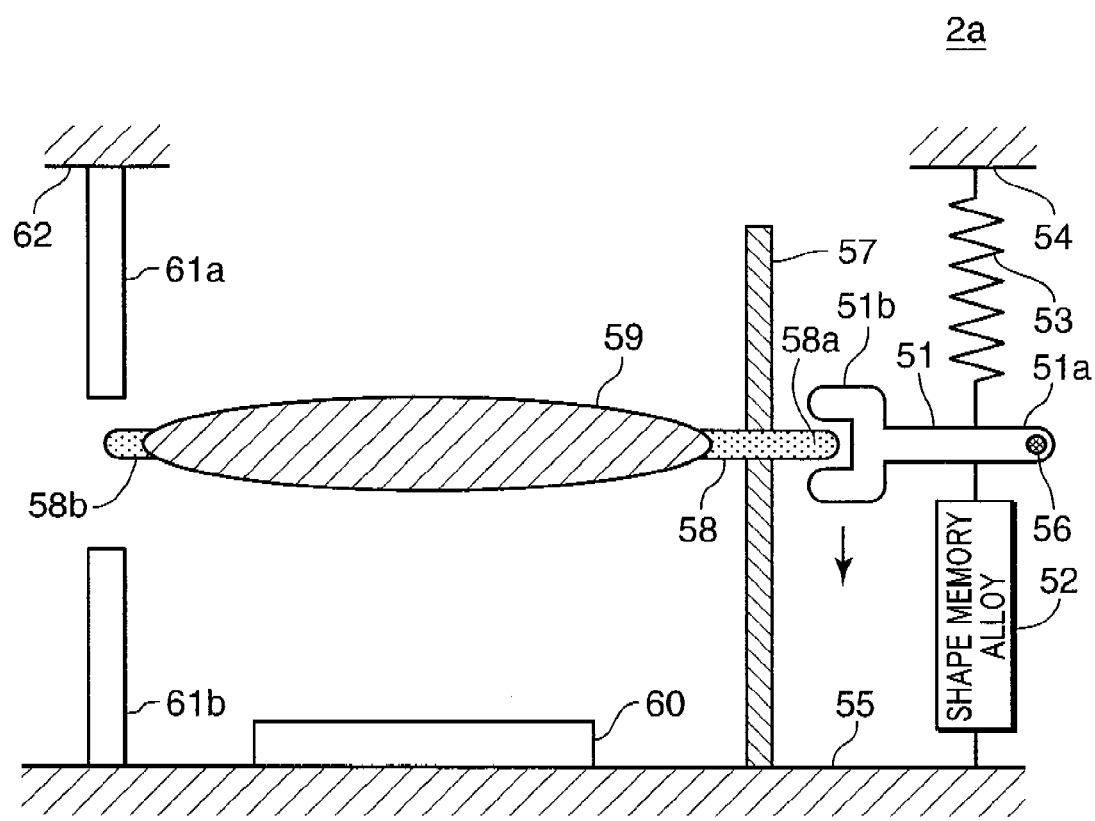
FIG. 6 is a schematic diagram showing a mechanical configuration of an image pickup system according to a second embodiment of the present invention.
Figure 7:
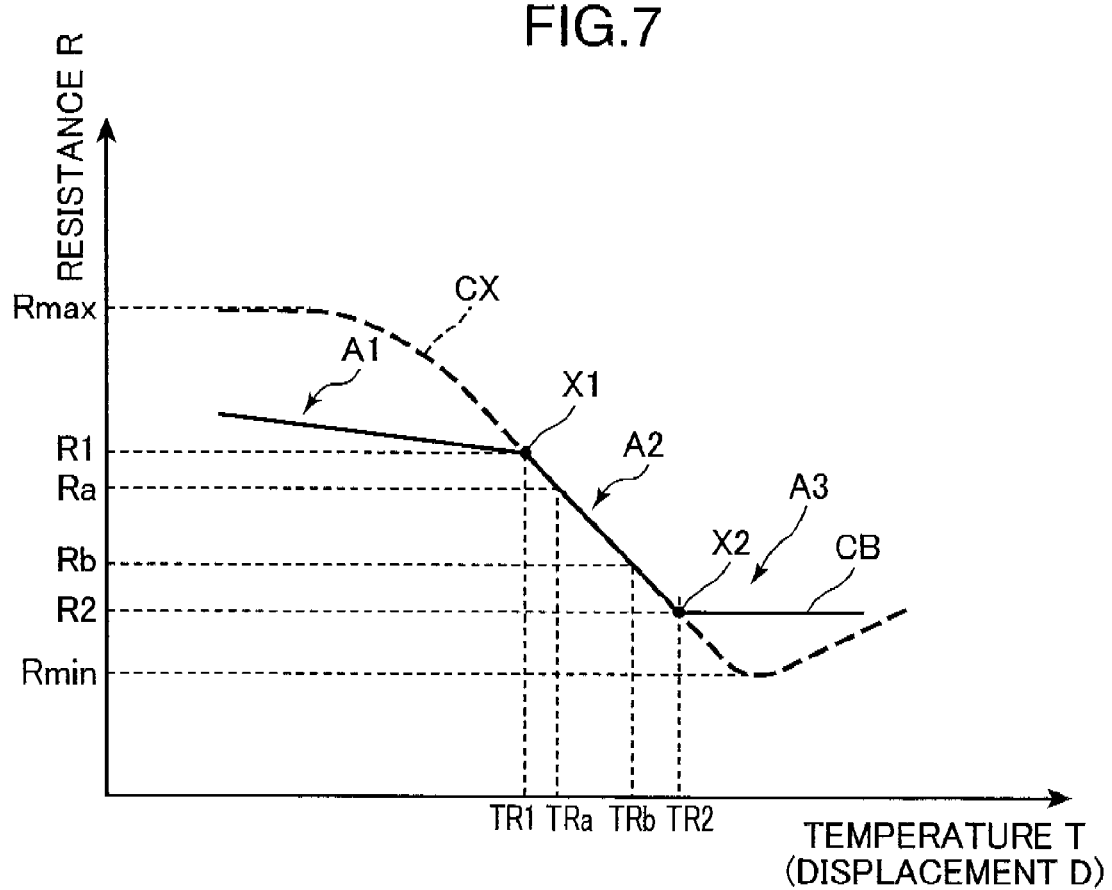
FIG. 7 is a graph showing a relationship between a temperature and a resistance of a shape-memory alloy member in a biased-type shape-memory-alloy actuator in the image pickup system according to the second embodiment.

FIG. 6 is a schematic diagram showing a mechanical configuration of an image pickup system according to a second embodiment of the present invention. FIG. 7 is a graph showing a relationship between a temperature and a resistance of a shape-memory alloy member in a shape-memory-alloy actuator in the image pickup system according to the second embodiment. In FIG. 7, the horizontal axis represents a temperature T (displacement D), and the vertical axis represents a resistance R. The solid line CB indicates a characteristic of the shape-memory-alloy member in the shape-memory-alloy actuator illustrated in FIG. 7, and the broken line CX indicates a characteristic of the shape-memory-alloy member in an isolated state.

In the image pickup system 2a according to the second embodiment, the driving mechanism 1a according to the first embodiment is used for driving a lens included in an image pickup optical system. This image pickup system 2a comprises a movable member 51, a SMA member 52, a biasing member 53, two immovable members 54, 64, a base plate 55, a guide member 57, a lens frame 58 (lens frame for supporting a lens), a lens 59, an image pickup device 60, a stopper member 61, and the position controller 20a illustrated in FIG. 3 or the position controller 20b illustrated in FIG. 5 (not shown in FIG. 6).

Except that the movable member 51 has a second end 51b formed in a generally angular-C shape in section, the movable member 51, the SMA member 52, the biasing member 53 and the immovable member 54 are identical, respectively, to the movable member 11, the SMA member 12, the biasing member 13 and the immovable member 14 in the driving mechanism 1a according to the first embodiment, and therefore their description will be omitted. The movable member 51 is swingably supported by a fixed shaft 56 corresponding to the fixed shaft 16 in the first embodiment. The base plate 55 also serves as the immovable member 15 in the driving mechanism according to the first embodiment. A combination of the movable member 51, the SMA member 52, the biasing member 53, the immovable member 54 and the base plate 55 makes up a shape-memory-alloy actuator.

The guide member 57 is designed to guide a moving direction of the lens frame 58, and composed, for example, of a columnar-shaped rod. The guide member 57 is fixed at a given position of the base plate 55 to extend upwardly therefrom.

The lens frame 58 is a member designed to support the lens 59. The lens frame 58 is formed with a pair of first and second sidepieces 58a, 58b extending radially outwardly from respective positions thereof lying in one diametral line. The first sidepiece 58a is formed with a hole for allowing the guide member 57 to penetrate therethrough, and disposed such that a distal end thereof is loosely fitted into an opening of the angular-C shape at the second end 51b of the movable member 51.

The lens 59 is an optical element operable to focus or diverge light, and included in an image pickup optical system operable to form an optical image of a target object on an image pickup surface of the image pickup device 60. For example, the lens 59 serves as a zoom lens or a focusing lens.

For example, the image pickup device 60 may be designed to photoelectrically convert light into respective image signals corresponding to R (red), G (green) and B (blue) components, according to a received light intensity so as to pick up an optical image formed by the image pickup optical system. The image pickup device 60 may comprise a single-sheet type color area sensor, called "Bayer type", wherein R, G and B color filters are attached on respective surfaces of two-dimensionally arranged photoelectric conversion elements of a CCD image sensor, in a checkered pattern. A CMOS image sensor or a VMIS image sensor may also be used as well as the CCD image sensor. The image pickup device 60 is disposed on the base plate 55 in such a manner that a center of the image pickup surface thereof is aligned with an optical axis of the image pickup optical system.

The stopper member 61 is designed to restrict a movable range of the lens frame 58. The stopper member 61 includes an upper stopper member 62a for restricting an uppermost position of the movable range of the lens frame 58, and a lower stopper member 62b for restricting a lowermost position of the movable range of the lens frame 58. The upper stopper member 61a is disposed on the immovable member 62 in such a manner as to come into contact with the second sidepiece 58b of the lens frame 58 when the lens frame 58 is moved upwardly, and the lower stopper member 61b is disposed on the base plate 55 in such a manner as to come into contact with the second sidepiece 58b of the lens frame 58 when the lens frame 58 is moved downwardly.

The base plate 55 is a member designed to support each of the SMA member 52, the guide member 57, the image pickup device 60 and the lower stopper member 61b.

An operation of the image pickup system according to the second embodiment will be described below. In the above image pickup system 2a, when the movable member 51 is swingingly moved about the fixed shaft 56 according to the driving force of the SMA member 52 and the biasing force of the biasing member 53, the lens frame 58 having the first sidepiece 58a loosely fitted in the opening of the angular C-shaped second end 51b the movable member 51 is moved. While the movable member 51 is swingingly moved about the fixed shaft 56, the lens frame 58 is moved in an upward/downward direction, because it is guided by the guide member 57 and thereby a direction of movement thereof is restricted. In conjunction with the movement of the lens frame 58, the lens 59 is moved. Thus, for example, an optical image of a target object can be zoomed when the lens 59 serves as a zoom lens, or can be focused on the image pickup surface of the image pickup device 60 when the lens 59 is used as a focusing lens.

The second sidepiece 58b of the lens frame 58 will be brought into contact with an distal edge of the upper stopper member 61a during an upward movement of the lens frame 58 so as to be restricted in the upward movement, or will be brought into contact with an distal edge of the lower stopper member 61b during a downward movement of the lens frame 58 so as to be restricted in the downward movement.

Therefore, as shown in FIG. 7, in the driving mechanism used in the image pickup system 2a according to the second embodiment, along with a rise of a temperature T of the SMA member 52, a resistance change rate A per unit temperature change in the SMA members 52 changes from a first rate A1 to a second rate A2 different from the first rate A1, at a first change point X1. Then, when the temperature T of the SMA member 52 is further increased, the second sidepiece 58b of the lens frame 58 is brought into contact with the distal edge of the lower stopper member 61b, and precluded from moving any further, whereby a displacement D of the SMA member 52 is also restricted. Thus, after the first change point X1, along with a rise of the temperature T of the SMA member 52, the resistance change rate A per unit temperature change in the SMA members 52 changes from the second rate A2 to a third rate A3 different from the second rate A2. That is, the resistance change-to-temperature change characteristic has a second change point X2 at which the resistance change rate A changes from the second rate A2 to the third rate A3, along with a rise of the temperature of the SMA member 52.

In the position controller 20 in the image pickup system according to the second embodiment, the change-point detection section 23b detects a resistance value R1 giving the first change point X1, and stores the detected resistance value R1 in the control section 23, in the same manner as that in the first embodiment.

Subsequently, the change-point detection section 23b detects the second change point X2 based on a resistance detected by the resistance detection section 22 (42), while gradually increasing an amount of electric power to be supplied from the driving section 24. Then, the change-point detection section 23b drives a resistance value giving the second change point X2, based on the resistance detected by the resistance detection section 22 (42), and stores the resistance value giving the second change point X2, in the control section 23, as a second resistance value R2. More specifically, the change-point detection section 23b is operable to gradually increase an amount S (n+1) of electric power to be supplied to the SMA member 52 by a given value s (n+1) which causes the SMA member 52 to have a unit temperature change, and the resistance detection section 22 is operable to detect a resistance Rsma of the SMA member 12 in each of the power supply amounts S. Then, the change-point detection section 23b is operable to calculate a difference between a currently-detected resistance value Rsma (n+1) and a previously-detected resistance value Rsma (n), and determine whether the calculated difference is less than a determination threshold Th, wherein the change-point detection section 23b is operable, when the calculated difference is less than a determination threshold Th, to judge that the second change point X2 is found out, and store the currently-detected resistance value Rsma (n+1) in the control section 23, as a second resistance value R2 giving the second change point X2.

The second change point X2 is an intersecting point between a straight line CB2 on which the resistance change rate A per unit temperature change (displacement change) in the SMA member 52 is the second rate A2, and a straight line CB3 on which the resistance change rate A per unit temperature change (displacement change) in the SMA member 52 is the third rate A3. Thus, in the same manner as that in the first embodiment, the change-point detection section 23a may be configured to calculate the straight line CB2 and the straight line CB3, and obtain the second resistance value R2 giving the second change point X2, based on an intersecting point between the straight lines CB2 and CB3.

In the position control for the movable member 51 in the shape-memory-alloy actuator 10, the position controller 20 is operable to control a position of the movable member 51, based on an actual resistance value Rsma of the SMA member 52 detected by the resistance detection section 22(42), by using the first resistance value R1 giving the first change point X1, as a reference value.

Through this operation, the image pickup system 2a according to the second embodiment and the position controller 20 can perform the position control for the movable member 51 in the shape-memory-alloy actuator 10, based on a resistance Rsma of the SMA member 52, without a position sensor.

Furthermore, in the position control for the movable member 51, the position controller 20 is operable to set, as a movement stop position of the movable member 51, the second resistance value R2 giving the second change point X2 which appears after the first change point X1. This makes it possible to adequately perform the position control for the movable member 51 so as to reduce a failure of the shape-memory-alloy actuator 10 due to damages in the movable member 51 or abnormal heating of the SMA member 52.

In the position control for the movable member 51, the position controller 20 in the second embodiment may be configured to calculate a first resistance value R1 giving the first change point X1 based on a second resistance value R2 giving the second change point X2, and control a position of the movable member 51 by using the calculated first resistance value R1 as a reference value. A position control similar to the above-mentioned position control can be accomplished by calculating a first resistance value R1 giving the first change point X1 based on a second resistance value R2 giving the second change point X2. In the image pickup system shown in FIG. 6, for example, the movable member 51 is moved downward by the driving force of the SMA member 52, and the change-point detection section 23*b* detects a second change point X2 which the second resistance value R2 gives when the lens frame 58 comes into contact with an end of the lower stopper member 61*b*. Next, as shown in FIG. 7, a first resistance value R1 giving the first change point X1 is calculated from the second resistance value R2, a second rate A2 which is advancedly calculated based on a material and shape of the SMA member 52, and a condition or a difference between TR2 and TR1 which is advancedly calculated based on a biasing force of the biasing member 53. When controlling the position of the movable member 51 in the shape-memory-alloy actuator 10, the position controller 20 controls the position of the movable member 51 based on an actual resistance value Rsma of the SMA member 52 which is detected by the resistance detection section 22(42) by using the calculated first resistance value R1 giving the first change point X1 as a reference value. Accordingly, the position controller 20 can control a position of the movable member 51 in the shape-memory-alloy actuator 10 based on a resistance value Rsma of the SMA member 52 without the use of a position sensor.

In the position control for the movable member 51, the position controller 20 in the second embodiment may be configured to set, as a movable range of the movable member 51, a given range falling between the first resistance value R1 and the second resistance value R2. For example, a range of the first resistance value R1 to the second resistance value R2 may be set as the movable range of the movable member 51. Alternatively, given that two resistance values less than the first resistance value R1 and greater than the second resistance value R2 are Ra and Rb (wherein Ra>Rb), a range of the resistance value Ra to the resistance value Rb may be set as the movable range of the movable member 51. Alternatively, a range of the first resistance value R1 to a third resistance value (R1−r) which is less than the first resistance value R1 by a given value "r" may be set as the movable range of the movable member 51.

The relationship between the resistance Rsma and the displacement D of the SMA member 52 has high linearity in the range of the first resistance value R1 and the second resistance value R2. Thus, in addition to the advantage of being able to adequately perform the position control for the movable member 51 so as to reduce a failure of the shape-memory-alloy actuator 10, the position controller 20 configured to set, as the movable range of the movable member 51, a given range falling between the first resistance value R1 and the second resistance value R2, can perform the position control for the movable member 51 with a higher degree of accuracy.

As above, the lens 59 is moved by the movable member 51 subjected to position control according to the above position controller 20. Thus, for example, an optical image of a target object can be zoomed with a higher degree of accuracy when the lens 59 serves as a zoom lens, or can be focused on the image pickup surface of the image pickup device 60 with a higher degree of accuracy when the lens 59 is used as a focusing lens.

The following description will be made about yet another embodiment of the present invention.

Third Embodiment

Figure 8:
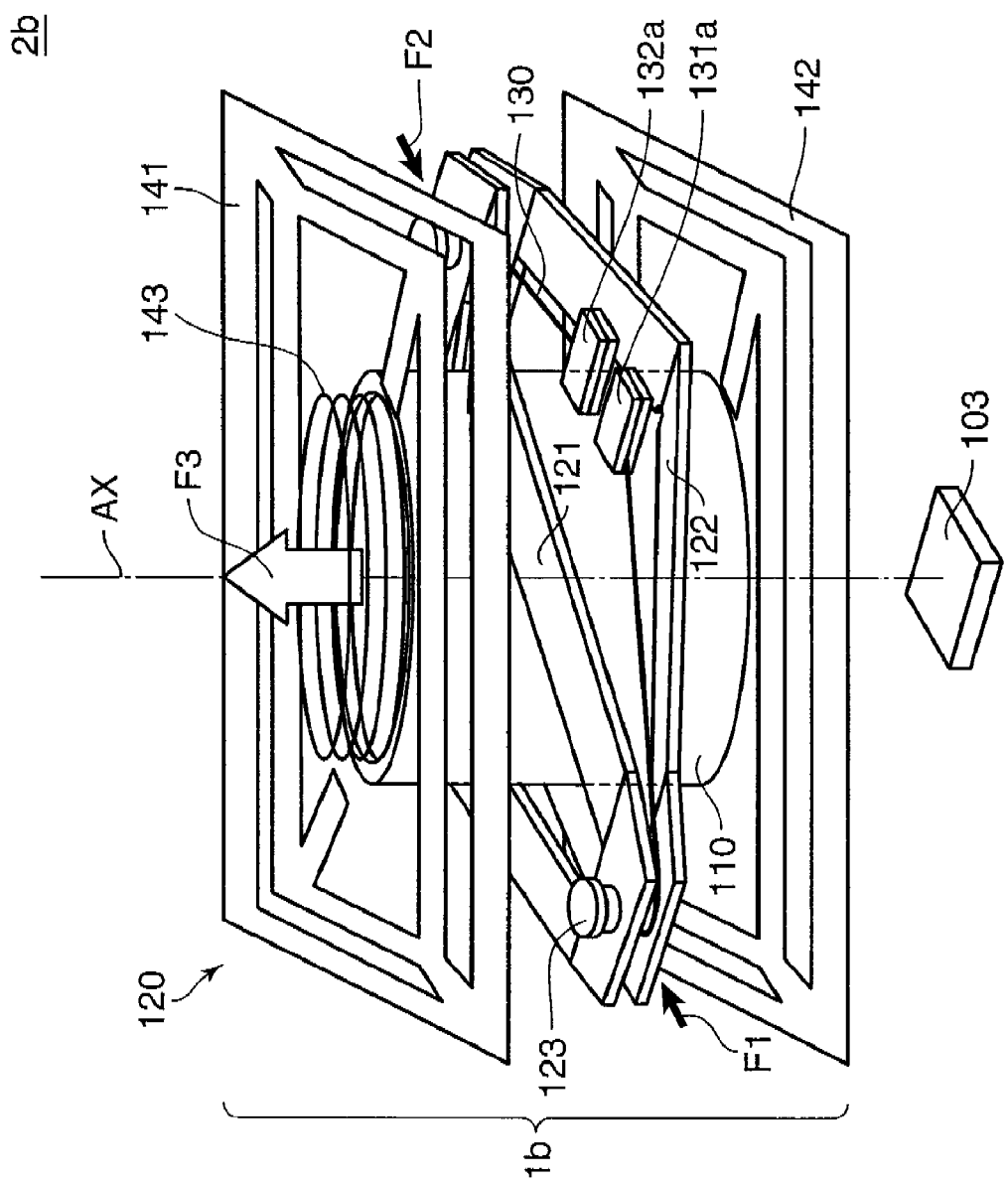
FIG. 8 is a schematic diagram showing a mechanical configuration of an image pickup system according to a third embodiment of the present invention.
Figure 9:
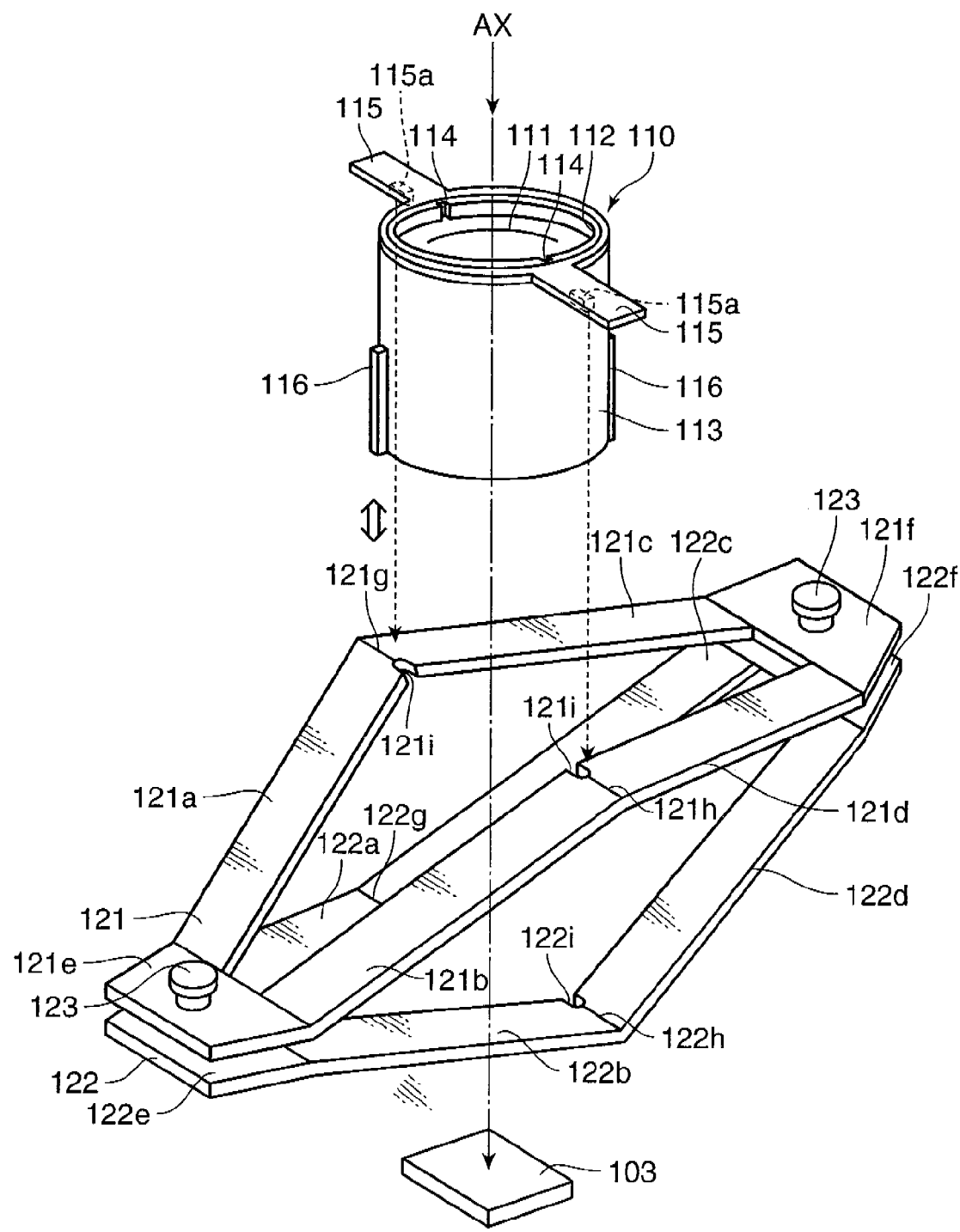
FIG. 9 is an exploded perspective view showing a principal part of the mechanical configuration of the image pickup system illustrated in FIG. 8.
Figure 10:
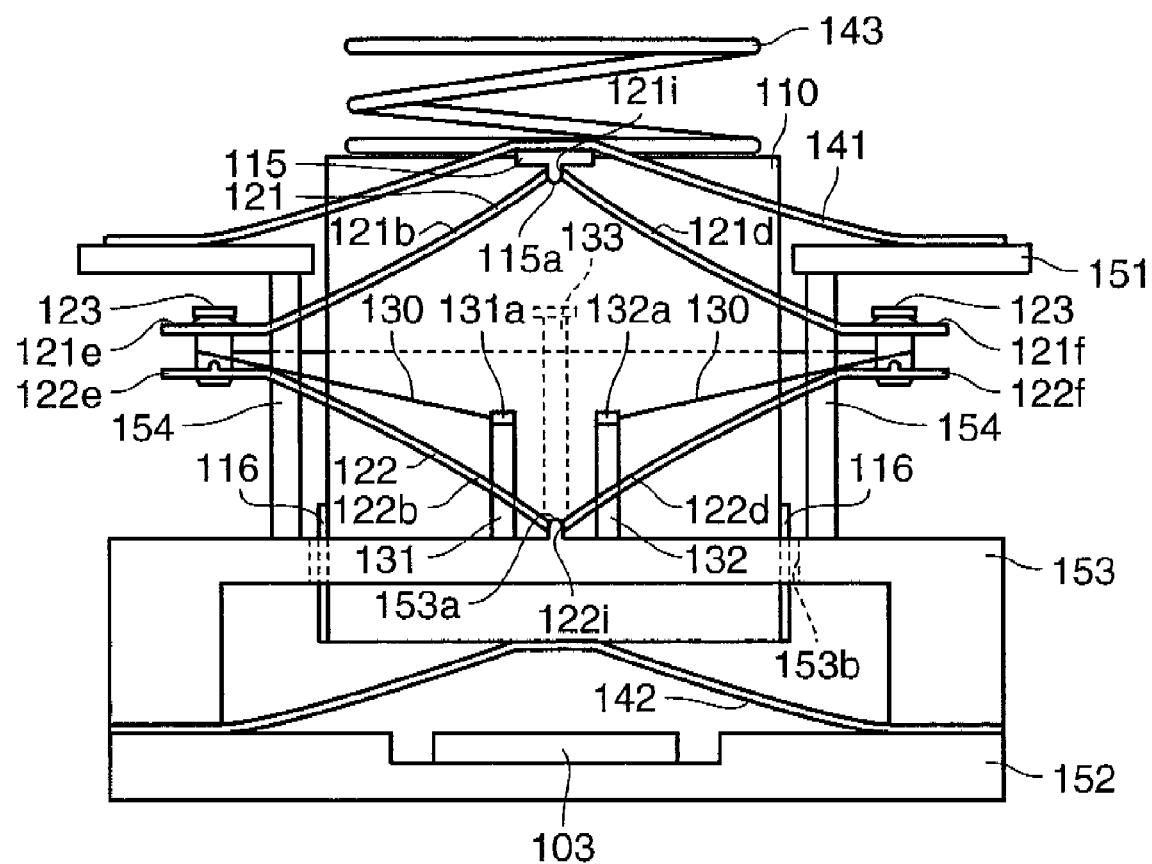
FIG. 10 is a vertical sectional view showing the mechanical configuration of the image pickup system illustrated in FIG. 8.

FIG. 8 is a schematic diagram showing a mechanical configuration of an image pickup system according to a third embodiment of the present invention. FIG. 9 is an exploded perspective view showing a principal part of the mechanical configuration of the image pickup system illustrated in FIG. 8. FIG. 10 is a vertical sectional view showing the mechanical configuration of the image pickup system illustrated in FIG. 8.

In the image pickup system according to the third embodiment, a driving mechanism 1*b* according the present invention is used for driving a lens included in an image pickup optical system. The image pickup system 2*b* according to the third embodiment comprises a lens unit, a driving mechanism 1*b* adapted to apply a driving force to the lens unit inwardly from outside so as to move the lens unit in a direction of an optical axis thereof, and a position controller 20 adapted to control the driving mechanism so as to control a position of the lens unit. The driving mechanism 1*b* includes: two link members each including four arms connected to each other to form a quadrangular shape so as to receive therein the lens unit; two joint portions joining respective ones of two pairs of corners along a first one of two diagonal lines in the two link members, with a given distance therebetween; and a wire-shaped SMA member wound around the joint portions, in such a manner that the joint portions joining respective ones of two pairs of the corners along the first diagonal line in the two link members serve as an input end of a driving force, and remaining corners along the other, i.e., second, diagonal line, serve as an output end of the driving force, wherein the lens unit is hung between the corners along the second diagonal line in one of the link members, whereby, in response to tightening/loosening of the SMA member, the corners along the second diagonal line are displaced to get away from/close to each other so as to allow the lens unit to be moved in the direction of the optical axis.

More specifically, as shown in FIGS. 8 to 10, the image pickup system 2*b* generally comprises: a lens unit 110; first and second link members 121, 122 serving as the driving mechanism 1*b* adapted to move the lens unit 110 in a direction of an optical axis AX thereof; a SMA member 130; a biasing spring 143; two spring members 141, 142 retaining the lens unit 110; an image pickup device 103 operable to photoelectrically convert an optical image of a target object disposed on the side of an image surface of the lens unit 110; and a position controller 20 (not shown in FIGS. 8 to 10), such as the position controller illustrated in FIG. 3 or 5.

The spring members 141, 142 are provided, respectively, to an upper base 151 and a lower base 152, i.e., fixing positions, on front and rear sides of the lens units 110, in such a manner as to allow the lens unit 110 to be moved in the direction of the optical axis AX while preventing a movement of the lens unit 110 in a direction intersecting with the optical axis AX. The biasing spring 143 is interposed relative to a front panel (not shown) or the like to prevent jumping-out of the lens unit 110 due to excessive tightening of the SMA member 130 at a high temperature equal to or greater than a transformation temperature, and allow the SMA member 130 to have a given amount of tightening when it is heated up to a given temperature by a certain current applied thereto, in view of a fact that a reaction temperature, i.e., phase-change characteristic, of the SMA member 130 varies depending on a level of tension imposed thereon.

As shown in FIG. 9, the lens unit 110 includes a lens frame 112 into which the lens 111 is fitted, and a lens barrel 113 designed to allow the lens frame 112 to be screwed into a front end thereof so as to mount any lens 111 thereto. The lens frame 112 is attached to the lens barrel 113 by engaging an external thread formed in an outer peripheral surface thereof, with an internal thread formed in an inner peripheral surface of the lens barrel 113, while holding a cutout 114 of the lens frame 112 by a tool or the like. The lens 111 may include a focusing lens or a zoom lens. The lens unit 110 makes up an image pickup optical system operable to form an optical image of a target object on an image pickup surface of the image pickup device 103.

The lens barrel 113 has a pair of hunger portions 115 formed on a front end thereof to extend radially outwardly from respective positions thereof lying in one diametral line. The lens unit 110 is engaged with (supported by) the first link member 121 through the hunger portions 115. The lens barrel 113 has a pair of line-shape guide protrusions 116 formed on the side of a rear end thereof to extend in the direction of the optical axis AX and at respective positions lying in a diametral line orthogonal to the diametral line along which the hanger portions 115 are formed.

The link member 121 (122) includes four arms 121a, 121b, 121c, 121d (122a, 122b, 122c, 122d) which are connected to each other through the use of two coupling portions 121e, 121f (122e, 122f), to form a diamond shape so as to receive therein the lens unit 110. A material of the link member 121 (122) is not limited to a specific type, but the link member 121 (122) may be made of any suitable material which has strength capable of transmitting a driving force therethrough, and allows a hinge point between each of the arms 121a, 121b; 121c, 121d (122a, 122b; 122c, 122d) and each of the coupling portions 121e; 121f (122e; 122f), and two hinge points between the arms 121a, 121c and between the arms 121b, 121d (two hinge points between the arms 122a, 122c and between the arms 122b, 122d), to be elastically deformed so as to serve as hinges. For example, the link member may be prepared by cutting out an arm material from a metal thin sheet or an elastic polymer sheet, and bending the arm material. It is particularly preferable to use a resin material which has a small flexural modulus in view of reducing a loss of energy due to elastic deformation at the joint, a large bending strength in view of preventing fracture due to elastic deformation, and excellent thermal resistance. Such a resin material may include polycarbonate and polyethylene terephthalate. The link members 121, 122 made of such a resin material can be used with the SMA material 130 in a contact manner, without concerning about electric short-circuit and heat escape due to the link members 121, 122.

In these link members 121, 122, the coupling portions 121e, 122e; 121f, 122f, i.e., two pairs of corners in a long-axis direction, are coupled to each other by two pins 123 (i.e., joint portions). Then, the SMA member 130 is wound around the pins 123, so that the pins 123 serve as a displacement input portion which receives an input of a driving force in a direction orthogonal to the optical axis AX. As shown in FIG. 10, based on the driving force applied to the displacement input portion, the link members 121, 122 have a pantograph-like movement in section along the long-axis direction. Then, in the link member 121 (122), two hinge points 121g, 121h (122g; 122h) between the arms 121a, 121c and between the arms 121b, 121d (between the arms 122a, 122c and between the arms 122b, 122d), i.e., corners in a short-axis direction, serve as a displacement output portion which is moved in the direction of the optical axis AX. The hanger portions 115 of the lens unit 110 is mounted on the hinge points 121g, 121h of the first link member 121, and the hinge points 122g, 122h of the second link member 122 are mounted on an intermediate base 153.

Each of the hinge points 121g, 121h (122g, 122h) has a cutout 121i (122i) formed form an inward side thereof. Instead of the cutout, a slit extending in the short-axis direction may be formed. A protrusion 115a formed on each of the hanger portions 115 is fitted into a corresponding one of the cutouts 121i of the first link member 121 to prevent displacement of the lens unit 110 in the long-axis direction. The cutout 121i may be formed to extend inwardly from outside. This cutout 121i or the slit can reliably prevent drop-out of the lens unit 110. Similarly, a protrusion 153a formed on the intermediate base 153 is fitted into a corresponding one of the cutouts 122i of the second link member 122 to prevent displacement of the second link member 122 in the long-axis direction.

The SMA member 130 is formed of a SMA prepared to pre-memorize a given shape, and operable, when it is heated, to apply a driving force to the pins 123. The SMA member 130 itself is identical to the SMA member 13 in the first embodiment. The SMA member 130 has opposite ends crimpedly fixed using two crimpable members 131a, 132a each serving as an electric-heating electrode.

Each of the coupling portions 121e, 121f, 122e, 122f has a concave portion formed by a drawing process, and each of the concave portions of the first link member 121 further has a hole formed in a bottom thereof by a punching process. Each of the pins 123 is inserted into a corresponding one of the holes, and a head of the pin 123 and a peripheral edge of the hole are fuse-bonded to each other using laser, ultrasonic or heater. Then, a distal end of the pin 123 inserted into the hole is adhesively bonded or fuse-bonded to the bottom of the concave portion. In this manner, the link members 121, 122 are assembled together in a pantograph-like mechanism. Each of the pair of coupling portions 121e, 121f and the pair of the coupling portions 122e, 122f are arranged parallel to each other with a distance therebetween, for example, by 0.4 to 0.5 mm.

The link members 121, 122 assembled together in the above manner are mounted on the intermediate base 153 while allowing the protrusions 153a into the respective cutouts 122i. The intermediate base 153 is provided with a plurality of support columns 154 mountingly supporting the upper base 151, two support columns 131, 132 supporting first and second opposite ends of the SMA member 130, and a support column 133 supporting an intermediate point of the SMA member 130, each extending upwardly therefrom. The SMA member 130 extends from the support column 131 to the support column 132 while being wound around the coupling portions 121e, 122e, the support column 133, and the pin 123 for the coupling portions 121f, 122f. That is, each of the support columns 131 to 133 is dispose to extend in the short-axis direction of the diamond shape (i.e., pantograph shape).

Then, a jig is fitted into a hole 153b formed in the intermediate base 153, in place of the lens unit 110, to support the link members 121, 122 in such a manner that the cutouts 121i, 122i are located at given positions (i.e., the pantograph shape has a given height), and the crimpable members 131a, 132a at respective distal ends of the support columns 131, 132 supporting the ends of the SMA member 130 are crimped to set a length and tension of the SMA member 130 at given values.

Subsequently, the jig is removed from the intermediate base 153, and the lower base 152 having the spring member 142 and the image pickup device 103 mounted thereto is attached. Then, the lens unit 110 having the biasing spring 143 attached thereto is inserted into the hole 53b to bring a rear end of the lens unit 110 into contact with the spring member 142.

Then, the upper base 151 having the spring member 141 is mounted on the support column 154, and the front end of the lens unit 110 is bonded to the spring member 141. In the above manner, the image pickup system 2b is completely assembled. The upper base 151 is formed with a hole for allowing the lens unit 110 to penetrate therethrough, and a hole for allowing the hanger arms 115 to be loosely fitted thereinto.

In order to eliminate a difference between a required length of the lens unit 110 and a stroke of the pantograph-like movement of the link members 121, 122, the intermediate 153 is provided on the lower base having the image pickup device 103 mounted thereto, on a case-by-case basis. In the third embodiment, by taking advantage of the presence of the intermediate base 153, the pair of line-shaped guide protrusions 116 extending in the direction of the optical axis AX are formed on the side of the rear end of the lens barrel 113 of the lens unit 110, and, correspondingly, a pair of concave-shaped guide grooves 153 extending in the direction of the optical axis AX are formed in the hole 153b of the intermediate base 153 for receiving therein the rear end of the lens barrel 113 as a portion of the lens unit 110 on the side of a projection surface thereof.

Thus, in the operation of screwing the lens frame 112 for the lens, in the front end of the lens barrel 113 having a cylindrical shape, a rotation of the lens barrel 113 about the optical axis AX can be suppressed and limited in the range of elastic deformation of the spring members 141, 142 suspending the lens unit 110, and any lens 111 can be attached to the lens barrel while using a common driving mechanism, to provide enhanced compatibility to lenses 111. In addition, the above structure can provide enhanced shock resistance. Furthermore, the above structure makes it possible to set the springs 141, 142 to be softener than ever before so as to provide enhanced stroke or facilitate downsizing. The guide protrusions 116 and the guide grooves are provided at positions on a diametral line orthogonal to the short-axis direction of the diamond shape, i.e., on a diametral line in the long-axis direction of the diamond shape. This can ensure a space therefor in a vicinity of the lens unit 110 in a relatively easy manner. The guide protrusions 116 and the guide grooves are provided in a pair and at symmetrical positions with respect to a gravity center of the lens unit 11 0. Thus, in the fitted state between the guide protrusions 116 and the guide grooves, the lens unit 110 can be stably moved without inclination of the lens unit 110 relative to the optical axis AX.

If it is difficult to arrange the intermediate base 153 due to the aforementioned relationship between the length of the lens unit 110 and the stroke of the pantograph-like movement, the guide groove may be formed in a special column provided on the lower base 152 to extend upwardly therefrom. In cases where the intermediate base 153 is provided, the intermediate base 153 can guide an outer peripheral surface of the lens unit 110 by the hole 153b thereof to move the lens unit 110 without axial misalignment (translation), while serving as such a special column. The guide protrusion 116 may be provided on the inner peripheral surface of the hole 153b of the intermediate base 153, and the guide groove 113 may be formed in the lens barrel 113.

The spring member 141 (142) has an annular shape formed to surround the lens unit 110, and comprises a first annular segment which is fixed to a fixing position of the upper base 151 (lower base 152), at positions opposed at 180 degrees in a circumferential direction thereof, a second annular segment formed along the first annular segment, a pair of connection segments connecting respective midpoints between the opposed positions of the first annular segment, to the second annular segment 141c, and a pair of support segments extending from respective midpoints between the connection segments to support the lens unit 110.

Each of the pair of connection segments and the pair of support segments are located at the same circumferential angular positions. One of the support segments is supported by a pair of spring members consisting of two portions of the first annular segment each extending from a respective one of the opposite fixed positions to a corresponding one of the connection segments in an approximately opposite direction, the connection segments, and two portions of the second annular segment each extending from the corresponding connection segment toward the original one of the fixed positions. Thus, each of the pair of connection segments and the pair of support segments can be moved to get close to/away from each other, so that, even if the lens unit 100 is moved in the direction of the optical axis AX, the connection segments can support the lens unit 100. In addition, even if the spring members are elastically deformed in conjunction with the movement of the lens unit 110 in the direction of the optical axis AX, generation of torque in the circumferential direction of the lens unit 110 can be suppressed, and the lens unit 110 can be reliably moved parallel to the optical axis AX without axial misalignment. Generally, in a leaf spring member requited for a relatively long stroke, it is necessary to increase a thickness or width of the spring member in order to obtain enhanced shock resistance. In the third embodiment, the rear end of the lens barrel 113 is fitted into the hole 156b of the intermediate base 153 to suppress the translation of the lens unit, and the guide protrusion 116 is fitted into the guide groove to prevent a rotation of the lens unit 110 in the circumferential direction. This makes it possible to ensure shock resistance without the need for increasing a thickness or width of the spring member.

The biasing spring 143 is operable to bias the lens unit 110 in a direction opposite to a direction of movement of the lens unit 110 according to movement (tightening) of the SMA member 130. The biasing spring 143 is composed of a compression spring having a diameter approximately conforming to an outer peripheral size of the lens frame 112, wherein one end (lower end) of biasing spring 143 is in contact with a top surface of the lens frame 112. For example, the other end (upper end) of the biasing spring 143 will be brought into contact with an inner surface of a housing of a portable phone (not shown).

The magnitude of spring force of this biasing spring 143 is set to be less than a driving force derived by the SMA member 130. Specifically, when the SMA member 130 is not activated, the lens unit 110 is pressed toward the lower base 152 (in FIG. 10, downwardly) to apply a certain level of tension to the SMA member 130. In response to activation of the SMA member 130, the lens unit 110 is moved in the opposite direction (in FIG. 10, upwardly) against the pressing force of the biasing spring 143. That is, after completion of an operation of the SMA member 130, the biasing spring 143 is operable to apply, to the lens unit 110, a biasing force allowing the lens unit 110 to be returned to its home position. This biasing spring 143 incorporated in the driving mechanism 1b can constantly apply a biasing force to the lens unit 110. Thus, the lens unit 110 can be returned to the home position by controlling an amount of electric power to be supplied to the SMA member 130.

The image pickup device 103 is designed to photoelectrically convert light into respective image signals corresponding to R (red), G (green) and B (blue) components, according to a light intensity of an optical image of a target object formed by the lens unit 110.

A mechanical movement of the above image pickup system will be described below. A given voltage is applied between the crimpable members 131a, 132a which serve as two electrodes of the SMA member 130, and the SMA member 130 is electrically heated up to a transformation temperature or more to generate a tightening force as a driving force. This tightening force is applied to the pins 123 serving as the displacement input portion of the link members 121, 122. Specifically, moving forces F1, F2 acting in opposite directions at 180 degrees and directing inwardly toward the optical axis AX are applied to the pins, respectively.

In response to receiving the moving forces F1, F2, the link members 121, 122 are deformed to have the pantograph-like movement in which a height dimension thereof gradually increases in the direction of the optical axis AX. Specifically, according to the moving forces F1, F2, the link member 121, 122 are deformed in such a manner that the hinges, i.e., the hinge point between each of the arms 121a, 121b; 121c, 121d; 122a, 122b; 122c, 122d and each of the coupling portions 121e; 121f, 122e; 122f, and the hinge points between the arms 121a, 121c, between the arms 121b, 121d, between the arms 122a, 122c and between the arms 122b, 122d, are bent to increase respective distances between the hinge points 121g, 122g and between the hinge points 121h, 122h. During this deformation, a moving force F3 allowing the distances to increase toward a target object side along the optical axis AX is generated only at the hinge points 121g, 121h of the first link member 121 serving as the displacement output portion, because the hinge points 122g, 122h of the second link member 122 are mounted on the intermediate base 153.

The moving force F3 is transmitted the hinge points 121g, 121h to the lens unit 110 through the hanger portions 115 to displace the lens unit 110 in the direction of the optical axis AX (i.e., to the position illustrated in FIG. 8). In this case, the annular segments of the spring members 141, 142 are warped upwardly (toward the target object side), and the biasing spring 143 is compressed.

When the power supply to the SMA member 130 is stopped, and the SMA member 130 is cooled down by natural heat release, the SMA member 130 is elongated by the biasing force of the biasing spring 143, and the lens unit 110 is returned to the home position along the direction of the optical axis AX. In the above manner, according to the ON/OFF of the power supply to the SMA member 130, the lens unit 110 can be displaced along the direction of the optical axis AX.

The image pickup system 2b according to the third embodiment is formed without any sliding mechanism and a gear engagement mechanism. This makes it possible to avoid occurrence of wobbling, backlash or the like, so as to drive the lens unit 110 with enhanced response and excellent output efficiency.

In the link members 121, 122 in the third embodiment, a displacement based on the tightening of the SMA member 130 is increased in two-stage manner and transmitted to the displacement output portion. Thus, the interlocking mechanism between the SMA member 130 to the link members 121, 122 allows a displacement to be input into the link members 121, 122 at a greater value than an actual tightening amount of the SMA member 130 (first stage of a displacement increasing function), and the structure of the link members 121, 122 can further increase the input displacement (second stage for the displacement increasing function). This makes it possible to provide a sufficiently large displacement to the lens unit 110, although the tightening amount of the SMA member 130 is only several % of its overall length.

In the position controller 20 of the image pickup system 2b according to the third embodiment, the change-point detection section 23b is firstly operable to detect a resistance value R1 giving the first change point X1, and store the resistance value R1 in the control section 23, in the same manner as that in the first embodiment. Then, in the position control for the lens unit 110, the position controller 23a is operable to control an amount of electric power to be supplied to the SMA member 130, based on an actual resistance value Rsma of the SMA member 130 detected by the resistance detection section 22 (42), by using the resistance value R1 giving the first change point X1 as a reference value, so as to adjust the magnitude of the moving forces F1, F2 to control a position of the lens unit 110.

This operation makes it possible to perform the position control for the lens unit 110, based on a resistance Rsma of the SMA member 130 without a position sensor.

The following description will be made about still another embodiment of the present invention.

Fourth Embodiment

FIGS. 11A and 11B are perspective exterior views showing a portable phone incorporating an image pickup system, according to a fourth embodiment of the present invention, wherein FIG. 11A illustrates a front exterior appearance, and FIG. 11B illustrates a rear appearance.

In the fourth embodiment, the image pickup system 2 according to the second or third embodiment is incorporated in a portable phone. Specifically, the forth embodiment shows one example where the image pickup system 2 according to the second or third embodiment is used for providing an automatic focus function or an optical zoom function to a lens of an image pickup optical system as a component of a camera unit OP to be incorporated in a camera-equipped portable phone 70. The image pickup system 2 in the fourth embodiment can be suitably applied to a digital still camera, a digital video camera and a personal digital assistant (PDA), as well as the camera-equipped portable phone 70.

As shown in FIG. 11, the camera-equipped portable phone 70 has a foldable structure in which a first housing 71 and a second housing 72 are coupled to each other through a hinge 73. The first housing 71 has a front surface provided with a liquid-crystal display unit 74 serving as a display section for displaying various information, and the second housing 72 has a front surface provided with a key input unit 75. The first housing 71 has a rear surface which is provided with a camera unit OP equipped with the image pickup system 2 according to the second or third embodiment, in such a manner that an objective lens is exposed outside the first housing.

The key input unit 75 includes various types of dial buttons for operating a portable phone function, a mode selection button for activating an image taking mode and switching between still-image and moving-image taking modes, a magnification change button for controlling an optical zoom (magnification) of the camera unit OP and a shutter button for performing an image taking operation.

Figure 12:
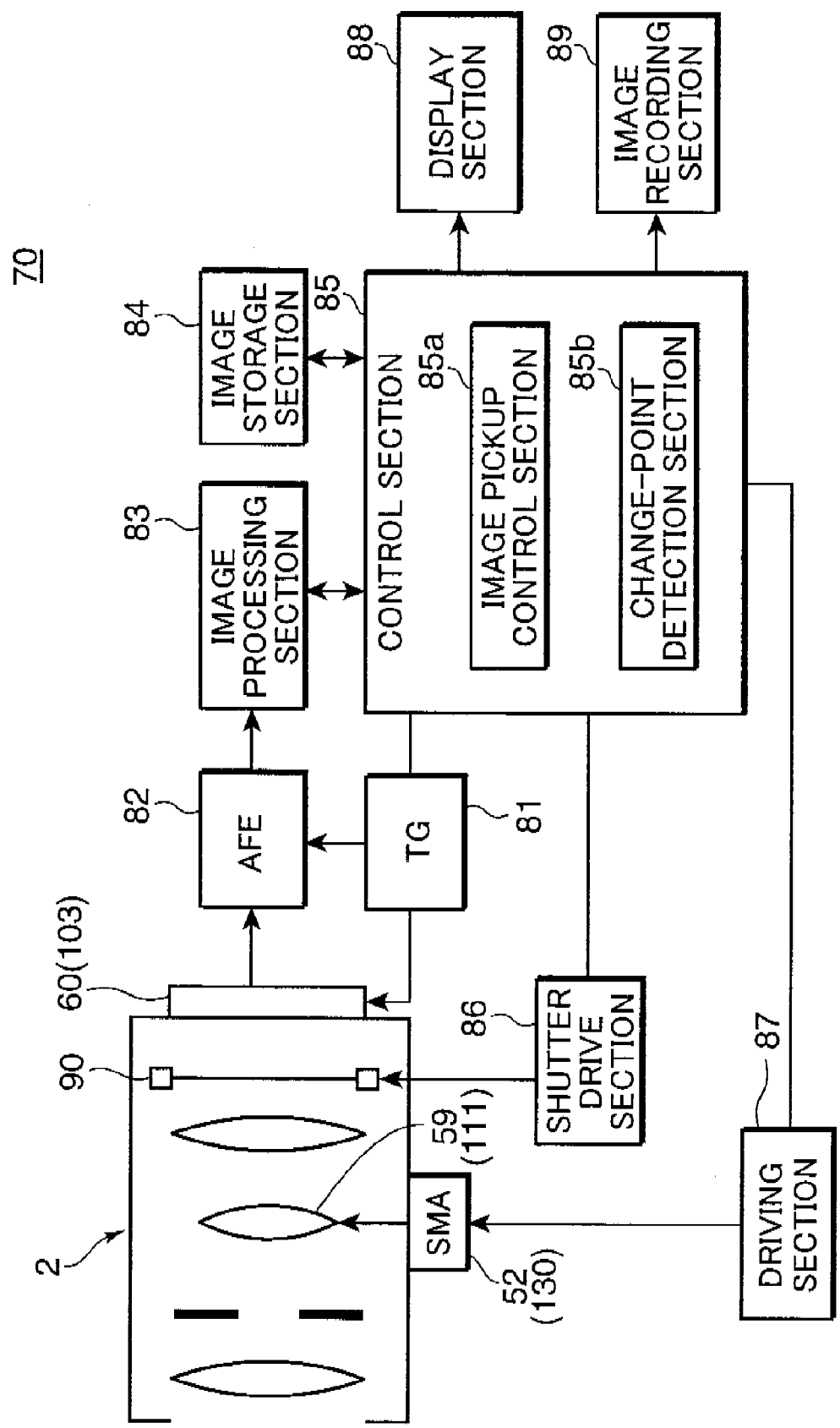
FIG. 12 is a block diagram showing an electrical configuration of the image pickup system according to the fourth embodiment.

As shown in FIG. 12, in addition to the image pickup system 2 according to the second or third embodiment, the camera-equipped portable phone 70 comprises a timing generator (TG) 81, analog frontend (AFN) 82, an image processing section 83, an image storage section 84, a control section 85, a shutter drive section 86, a driving section 87, a display section 88, and an image recording section 89.

The timing generator 81 is designed to control an image taking operation (<charge accumulation and reading of accumulated charges> based on exposure) according to the image pickup device 60 (103). The timing generator 81 is operable to generate a given timing pulse (a vertical transfer pulse, a horizontal transfer pulse, a charge discharge pulse, etc.) based on a reference clock output from the control section 85, and output the timing pulse to the image pickup device 60 (103) so as to control an image pickup operation of the image pickup device 60 (103). Further, the timing generator 81 is operable to generate a given timing pulse and output the timing pulse to the analog frontend 82 so as to control an A/D conversion operation.

The analog frontend 82 is designed to, after subjecting an image signal (a group of analog signals received by pixels of a CCD area sensor) output from the image pickup device 60 (103), to a given signal processing, convert the image signal into a digital signal and output the digital signal to the image processing section 83. The analog frontend 82 comprises a correlated double sampling circuit for reducing reset noise included in an analog image signal voltage, an automatic gain control circuit for correcting a level of an analog image signal, a clamping circuit for fixing a potential indicative of a black level, and an A/D conversion circuit for converting analog R, G, B signals to a digital signal, e.g., 14-bit digital signal.

The image processing section 83 is designed to subject image data output from the analog frontend 82 to a given image processing so as to create an image file. The image processing section 83 comprises a black level correction circuit, a white balance control circuit, a color compensation circuit, and a gamma correction circuit. In synchronization with reading image data from the image pickup device 60 (103), image data acquired by the image processing section 83 is written in the image storage section 84 once, and, subsequently, the image data written in the image storage section 84 is accessed to perform processing in each block of the image processing section 83.

In the image taking mode, the image storage section 84 is operable to temporarily store image data output from the image processing section 83, and serve as a memory for use as a working area for the control section 85 to subject the image data to a given processing. In a reproducing mode, the image storage section 84 is operable to temporarily store image data read from the image recording section 89.

The control section 85 is a circuit composed, for example, of a microprocessor and a peripheral circuit thereof, and designed to control each section of the camera-equipped portable phone 70 depending on each of the functions. The control section 85 functionally includes an image pickup control section 85*a* operable to serve as a position control section and control an image pickup operation, and a change-point detection section 85*b* operable to detect the first and second change points X1, X2.

The shutter drive section 86 is designed to drivingly open and close a shutter 90 in such a manner that the shutter 90 is opened for a given time period according to a shutter open/close control signal from the control section 85.

The driving section 87 is a power supply circuit designed to supply power to the SMA member 52 (130) according to control of the control section 85 so as to move the lens 59 (lens unit 110). For example, in cases where the lens 59 (lens unit 110) is a focusing lens, the driving section 87 is operable to supply power to the SMA member 52 (130) according to control of the control section 85 so as to allow an optical image of a target object to be formed on an image pickup surface of the image pickup device 60.

The display section 88 corresponds to the liquid-crystal display unit 74 illustrated in FIG. 11. The display section 88 is adapted to display thereon a picked-up image, a live view image before an image pickup operation, etc. The image recording section 89 is composed, for example, of a memory card, and designed to store image data subjected to an image processing in the image processing section 83.

In the above camera-equipped portable phone 70, the change-point detection section 85*b* is firstly operable to detect a resistance value R1 giving the first change point X1, and store the resistance value R1 in the control section 85, in the same manner as that in the first embodiment. Then, in the position control for the lens 59 (lens unit 110), the image pickup control section 85*a* is operable to control a position of the lens 59 (lens unit 110), based on an actual resistance value Rsma of the SMA member 130 detected by the resistance detection section 22 (42), by using the resistance value R1 giving the first change point X1 as a reference value.

Through this operation, the camera-equipped portable phone 70 in the fourth embodiment can perform the position control for the lens 59 (lens unit 110), based on a resistance Rsma of the SMA member 52 (130) without a position sensor.

As above, various techniques are disclosed in this specification. Among them, a major technique will be summarized as follows.

In one aspect of the present invention, a position controller usable with a shape-memory-alloy actuator adapted to move a movable member using a shape-memory-alloy member in a biased manner, and capable of controlling a position of the movable member, comprises a control section operable to control a position of the movable member, by using, as a reference value, a first resistance value R1 giving a first change point X1 at which a resistance change rate A per unit temperature change in the shape-memory-alloy member changes from a first rate A1 to a second rate A2 different from the first rate A1. The first resistance value R1 is less than a maximum resistance value Rmax of the shape-memory-alloy member in an isolated state. Further, the first resistance value R1 is greater than a minimum resistance value Rmin of the shape-memory-alloy member in an isolated state.

In the above position controller, a first resistance value R1 giving a first change point X1 at which a resistance change rate A per unit temperature change in the shape-memory-alloy member changes from a first rate A1 to a second rate A2 different from the first rate A1 is used as a reference value of the position control. This makes it possible to perform the position control for the movable member, based on a resistance of the shape-memory-alloy member.

In another aspect of the present invention, the control section is operable to set, as a movement stop position of the movable member, a second resistance value R2 giving a second change point X2 which appears after the first change point X1 and at which the resistance change rate A changes from the second rate A2 to a third rate A3 different from the second rate A2.

Under a condition that a displacement of the shape-memory-alloy member or a movement of the movable member to be induced by a driving force of the shape-memory-alloy member is restricted, the movement of the movable member or the displacement of the shape-memory-alloy member is also restricted. As a result, after the first change point X1, the resistance change rate A per unit temperature change changes from the second rate A2 to a third rate A3 different from second rate A2. This resistance change-to-temperature change characteristic changes from the solid line CB to the one-dot chain line CBa, as illustrated in FIG. 1. That is, along with a rise of the temperature of the shape-memoryalloy member, the second change point X2 at which the resistance change rate A changes from the second rate A2 to the third rate A3 appears in the resistance change-to-temperature change characteristic.

According to the above feature, a second resistance value R2 giving a second change point X2 which appears after the first change point X1 and at which the resistance change rate A changes from the second rate A2 to a third rate A3 different from the second rate A2 is set as a movement stop position of the movable member. This makes it possible to adequately control a position of the movable member so as to reduce a failure of a shape-memory-alloy actuator due to damages in the movable member or abnormal heating of the shape-memory-alloy member.

In another aspect of the present invention, the control section is operable to calculate said first resistance value R1 giving said first change point X1 based on said second resistance value R2 giving said second change point X2, and control a position of the movable member with reference to said calculated first resistance value R1.

According to this feature, the first resistance value R1 giving said first change point X1 is calculated based on the second resistance value R2 giving said second change point X2 at which a resistance change rate A per unit temperature change in the shape-memory-alloy member changes from a second rate A2 to a third rate A3 different from the second rate A2, and then the calculated first resistance value R1 is used as a reference value of the position control. This makes it possible to perform the position control for the movable member, based on a resistance of the shape-memory-alloy member.

In another aspect of the present invention, the control section is operable to set, as a movable range of the movable member, a given range falling between the first resistance value and the second resistance value. For example, a range of the first resistance value R1 to the second resistance value R2 is set as the movable range of the movable member. Alternatively, given that two resistance values less than the first resistance value R1 and greater than the second resistance value R2 are Ra and Rb (wherein Ra>Rb), a range of the resistance value Ra to the resistance value Rb is set as the movable range of the movable member. The relationship between the resistance R and the displacement of the shape-memory-alloy member has high linearity in the range of the first resistance value R1 and the second resistance value R2. Thus, according to the above feature, a given range falling between the first resistance value R1 and the second resistance value R2 can be set as the movable range of the movable member to perform the position control for the movable member with a higher degree of accuracy.

In another aspect of the present invention, the control section is operable to set, as a movable range of the movable member, a range of the first resistance value R1 to a third resistance value (R1−r) less than the first resistance value R1 by a given value "r".

According to this feature, a range of the first resistance value R1 to a third resistance value (R1−r) less than the first resistance value R1 by a given value "r" can be set as a movable range of the movable member to perform the position control for the movable member with a higher degree of accuracy.

In another aspect of the present invention, the position controller further includes: a driving section operable to supply electric power to the shape-memory-alloy member so as to electrically heat the shape-memory-alloy member; a resistance detection section operable to detect a resistance of the shape-memory-alloy member; and a change-point detection section operable to detect the first change point based on the resistance detected by the resistance detection section, while gradually increasing an amount of electric power to be supplied from the driving section.

In this position controller, the change-point detection section detects the first change point X1 based on the resistance detected by the resistance detection section, while gradually increasing an amount of electric power to be supplied from the driving section. This makes it possible to automatically detect the first change point X1 so as to cope with fluctuation in the first change point X1 due to variations in production or environmental conditions. Thus, the first change point X1 can be detected depending on variations in production or environmental conditions to adequately set the reference value so as perform the position control for the movable member with a higher degree of accuracy.

In another aspect of the present invention, a driving mechanism comprises a shape-memory-alloy actuator adapted to move a movable member using a shape-memory-alloy member in a manner to apply a biasing force thereto, and a position controller adapted to control a position of the movable member, wherein the position controller is comprised of the above position controller.

This makes it possible to provide a driving mechanism equipped with the above position controller, i.e., a driving mechanism capable of performing the position control for the movable member, based on a resistance of the shape-memory-alloy member without a position sensor.

In another aspect of the present invention, an image pickup system comprises: a shape-memory-alloy actuator adapted to move a movable member using a shape-memory-alloy member in a biased manner; a lens adapted to be moved in conjunction with the movement of the movable member; an image pickup device adapted to pick up an optical image of a target object formed by an image pickup optical system including the lens; and a position controller adapted to control a position of the movable member, wherein the position controller is comprised of the above position controller.

This makes it possible to provide an image pickup system equipped with the above position controller, i.e., an image pickup system capable of performing the position control for the movable member, based on a resistance of the shape-memory-alloy member without a position sensor.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A position controller adapted to be used with a shape-memory-alloy actuator adapted to move a movable member using a shape-memory-alloy member in a biased manner, and to be used with a first stopper member configured to restrict a movable range of the movable member, said position controller comprising:

a control section operable to control a position of said movable member, by using, as a reference value, a first resistance value corresponding to a first change point at which a resistance change rate per unit temperature change in said shape-memory-alloy member changes from a first rate to a second rate different from said first rate;

a driving section operable to supply electric power to said shape-memory-alloy member so as to electrically heat said shape-memory-alloy member;

a resistance detection section operable to detect a resistance of said shape-memory-alloy member at different electric power levels supplied by the driving section; and a change-point detection section operable to detect said first change point corresponding to the point at which the movable member comes in contact with the first stopper member, said first change point being based on at least two resistances detected by said resistance detection section, with said at least two resistances corresponding to at least two different electric power levels.

2. The position controller as defined in claim 1, wherein said first resistance value is less than a maximum resistance value of said shape-memory-alloy member in an isolated state.

3. The position controller as defined in claim 1, wherein said first resistance value is greater than a minimum resistance value of said shape-memory-alloy member in an isolated state.

4. The position controller as defined in claim 1, wherein said control section is operable to set, as a movement stop position of said movable member, a second resistance value giving a second change point which appears after said first change point and at which said resistance change rate changes from said second rate to a third rate different from said second rate.

5. The position controller as defined in claim 1, wherein said control section is operable to set, as a movable range of said movable member, a range of said first resistance value to a third resistance value less than said first resistance value by a given value.

6. The position controller of claim 1, further comprising:
a second stopper member, wherein the movement of the movable member is controlled between the first and second stopper members.

7. The position controller as defined in claim 4, wherein said control section is operable to calculate said first resistance value giving said first change point based on said second resistance value giving said second change point, and control a position of said movable member with reference to said calculated first resistance value.

8. The position controller as defined in claim 4, wherein said control section is operable to set, as a movable range of said movable member, a given range falling between said first resistance value and said second resistance value.

9. A driving mechanism comprising:
a shape-memory-alloy actuator adapted to move a movable member using a shape-memory-alloy member in a manner to apply a biasing force thereto; and
a position controller adapted to control a position of said movable member and to be used with a first stopper member configured to restrict a movable range of the movable member, said position controller comprising:
  a control section operable to control a position of said movable member, by using, as a reference value, a first resistance value corresponding to a first change point at which a resistance change rate per unit temperature change in said shape-memory-alloy member changes from a first rate to a second rate different from said first rate;
  a driving section operable to supply electric power at varying levels to said shape-memory-alloy member so as to electrically heat said shape-memory-alloy member;
  a resistance detection section operable to detect a resistance of said shape-memory-alloy member at the varying electric power levels supplied by the driving section; and
  a change-point detection section operable to detect said first change point corresponding to the point at which the movable member comes in contact with the first stopper member, said first change point being based on at least two resistances detected by said resistance detection section, with said at least two resistances corresponding to at least two different electric power levels.

10. The driving mechanism of claim 9, wherein said shape memory alloy is adapted to move the moving member in a swinging manner about a fixed shaft.

11. The driving mechanism of claim 9, wherein the positional controller further comprises a second stopper member, and the movement of the movable member is controlled between the first and second stopper members.

12. An image pickup system comprising:
a shape-memory-alloy actuator adapted to move a movable member using a shape-memory-alloy member in a biased manner;
a lens adapted to be moved in conjunction with the movement of said movable member;
an image pickup device adapted to pick up an optical image of a target object formed by an image pickup optical system including said lens; and
a position controller adapted to control a position of said movable member and to be used with a first stopper member configured to restrict a movable range of the movable member, said position controller comprising:
  a control section operable to control a position of said movable member, by using, as a reference value, a first resistance value corresponding to a first change point at which a resistance change rate per unit temperature change in said shape-memory-alloy member changes from a first rate to a second rate different from said first rate;
  a driving section operable to supply electric power at varying levels to said shape-memory-alloy member so as to electrically heat said shape-memory-alloy member;
  a resistance detection section operable to detect a resistance of said shape-memory-alloy member at the varying electric power levels supplied by the driving section; and
  a change-point detection section operable to detect said first change point corresponding to the point at which the movable member comes in contact with the first stopper member, said first change point being based on at least two resistances detected by said resistance detection section, with said at least two resistances corresponding to at least two different electric power levels.

13. The driving mechanism of claim 12, wherein said shape memory alloy is adapted to move the moving member in a swinging manner about a fixed shaft.

14. The image pickup system of claim 12, wherein the positional controller further comprises a second stopper member, and the movement of the movable member is controlled between the first and second stopper members.

* * * * *